United States Patent
Pieczul et al.

(10) Patent No.: US 12,052,245 B2
(45) Date of Patent: *Jul. 30, 2024

(54) TECHNIQUES FOR SELECTIVE CONTAINER ACCESS TO CLOUD SERVICES BASED ON HOSTING NODE

(71) Applicant: Oracle International Corporation, Redwood Shores, CA (US)

(72) Inventors: Olgierd Stanislaw Pieczul, Dublin (IE); Shrey Arora, Seattle, WA (US); Robert Graham Clark, Clyde Hill, WA (US)

(73) Assignee: Oracle International Corporation, Redwood Shores, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/144,951

(22) Filed: May 9, 2023

(65) Prior Publication Data

US 2023/0388302 A1 Nov. 30, 2023

Related U.S. Application Data

(63) Continuation of application No. 17/143,133, filed on Jan. 6, 2021, now Pat. No. 11,695,765.

(51) Int. Cl.
*H04L 65/1069* (2022.01)
*G06F 21/45* (2013.01)
(Continued)

(52) U.S. Cl.
CPC ...... *H04L 63/0876* (2013.01); *H04L 63/0236* (2013.01); *H04L 63/20* (2013.01); *H04L 67/561* (2022.05)

(58) Field of Classification Search
None
See application file for complete search history.

(56) References Cited

U.S. PATENT DOCUMENTS 7,127,461 B1 10/2006 Zhu et al.
11,032,287 B1 6/2021 Wang et al.
(Continued)

OTHER PUBLICATIONS

A Review of MongoDB and Singularity Container Security in regards to HIPAA Regulations. Dissanayaka. ACM. (Year: 2017).
(Continued)

*Primary Examiner* — Venkat Perungavoor
(74) *Attorney, Agent, or Firm* — Invoke

(57) ABSTRACT

A system and technique for a Request Forwarder as for a computer network architecture is disclosed to provide selective access to one or more cloud services. In some implementations, a computer system may receive a request for access to a cloud service, the request including a container credential. The computer system may determine an identification of the container using the container credential. The computer system may verify that the container requesting access to the cloud service is authorized based at least in part on stored policies. Based at least in part on the determination that the container requesting access to the cloud service is authorized: receiving instance credential from a metadata service. The computer system may include the instance credential with the request. The computer system may send the request to the cloud service. In various examples, the Request Forwarder can be provided as a service.

27 Claims, 10 Drawing Sheets

(51) Int. Cl.
*G06F 21/62* (2013.01)
*H04L 9/40* (2022.01)
*H04L 67/561* (2022.01)
*G06F 21/71* (2013.01)
*H04L 65/1066* (2022.01)

(56) References Cited

U.S. PATENT DOCUMENTS

| | | |
|---|---|---|
| 2010/0115291 A1 | 5/2010 | Buer |
| 2017/0214701 A1 | 7/2017 | Hasan |
| 2017/0228182 A1 | 8/2017 | Novak et al. |
| 2018/0191725 A1 | 7/2018 | Luukkala |
| 2018/0316676 A1 | 11/2018 | Gilpin et al. |
| 2018/0367528 A1 | 12/2018 | Schwarz et al. |
| 2019/0020665 A1 | 1/2019 | Surcouf et al. |
| 2019/0081955 A1 | 3/2019 | Chugtu et al. |
| 2019/0098055 A1 | 3/2019 | Pitre et al. |
| 2020/0097195 A1 | 3/2020 | Fritz et al. |
| 2020/0120102 A1 | 4/2020 | Cybulski et al. |
| 2020/0272712 A1 | 8/2020 | Pintér et al. |
| 2020/0301839 A1 | 9/2020 | Kral et al. |
| 2022/0209939 A1 | 6/2022 | Skuliber et al. |
| 2022/0217139 A1 | 7/2022 | Pieczul et al. |

OTHER PUBLICATIONS

Secure Kubernetes Networking Design Based on Zero Trust Model: A Case Study of Financial Service Enterprise in Indonesia. Surantha. Springer. (Year: 2020).
SPICE—Simple Privacy-Preserving Identity-Management for Cloud Environment. Chow. Springer-Verlag. (Year: 2012).
U.S. Appl. No. 17/177,159, Non-Final Office Action mailed on Aug. 4, 2022, 13 pages.
"Multifactor Authentication (MFA)", IBM Cloud Docs / App ID, Available Online at: https://cloud.ibm.com/docs/appid?topic=appid-cd-mfa, Sep. 22, 2020, 15 pages.
U.S. Appl. No. 17/143,133, "Ex Parte Quayle Action", filed Jan. 23, 2023, 5 pages.
U.S. Appl. No. 17/143,133, Non-Final Office Action, Mailed on Jul. 26, 2022, 11 pages.
U.S. Appl. No. 17/143,133, Notice of Allowance, Mailed on Feb. 17, 2023, 6 pages.
U.S. Appl. No. 17/177,159, Notice of Allowance, Mailed on Feb. 23, 2023, 9 pages.
Chow et al., "SPICE—Simple Privacy-Preserving Identity-Management for Cloud Environment", Springer-Verlag, Applied Cryptography and Network Security, Jun. 2012, pp. 526-543.
Dissanayaka et al., "A Review of MongoDB and Singularity Container Security in regards to HIPAA Regulations", ACM, UCC Companion: Companion Proceedings of the 10th International Conference on Utility and Cloud Computing, Dec. 2017, pp. 91-97.
Application No. PCT/US2022/015608, International Search Report and Written Opinion, Mailed on May 4, 2022, 13 pages.
Surantha et al., "Secure Kubernetes Networking Design Based on Zero Trust Model: A Case Study of Financial Service Enterprise in Indonesia", Springer Link, Innovative Mobile and Internet Services in Ubiquitous Computing, 2020, pp. 348-361.

TECHNIQUES FOR SELECTIVE CONTAINER ACCESS TO CLOUD SERVICES BASED ON HOSTING NODE

CROSS-REFERENCES TO RELATED APPLICATIONS

This application is a continuation of U.S. application Ser. No. 17/143,133, filed Jan. 6, 2021, which is hereby incorporated by reference in its entirety for all purposes.

BACKGROUND

Infrastructure and Platform as a service cloud providers support integrated authentication. In particular, customer workloads, hosted on cloud provider's infrastructure can authenticate using an identity of compute instances they are hosted on. This model can allow customers to build secure workloads. Without it, a customer would be required to bootstrap their instances, or applications running on them, with credentials each time they are created, and ensure that such credentials are recognized by cloud services.

Modern computing frameworks abstract the concept of a machine. The machine can be considered just a unit of processing. For example, a commercially available container management/clustering service can be used to manage various containers. Modern applications are increasingly built using containers, which are micro services packaged with their dependencies and configurations. Container management/clustering service is software for deploying and managing those containers at scale. As applications grow to span multiple containers deployed across multiple servers, operating them becomes more complex. To manage this complexity, a container management/clustering service provides an open source application programming interface (API) that controls how and where those containers will run. Container management/clustering service orchestrates clusters of virtual machines and schedules containers to run on those virtual machines based on their available compute resources and the resource requirements of each container. Containers are grouped into pods, the basic operational unit for container management/clustering service, and those pods scale to the desired state. container management/clustering service also automatically manages service discovery, incorporates load balancing, tracks resource allocation, and scales based on compute utilization. And, it checks the health of individual resources and enables apps to self-heal by automatically restarting or replicating containers.

A network orchestrator can be used to assign the number of instances for each container. Based on how busy each of the machines are, containers can be added or removed to create high workload density to result in cost savings. Containers can be customized for high input/output (I/O) bandwidth for increased performance.

Cloud providers can issue an identity for each of the compute nodes. In this way, the nodes can have their own identity. There is a standard mechanism of obtaining that identity. So if the container is running a process on the node, the system can call a specific IP address for example. This can return a specific identity ephemeral credential that is associated with that specific instance. That credential would have multiple parameters like what is a specific machine but also what group of machines that machine belongs to.

In an example, a customer can use two services from the cloud vendor (e.g., compute and object storage). A customer's application runs on compute instances and stores and retrieves data from object storage buckets. Without an integrated authentication mechanism, the customer would be forced to operate in the same fashion as in legacy pre-cloud environments. That is, the customer would need to: create users under their account; grant those users access to object storage; and provide user's credentials to the application. This last step can be particularly problematic. The credential has to be placed on the system before the application can become operational. If the system restarts, or new machines are added, this step has to be repeated. It also has to be performed manually by an engineer that has access to the credential, which increases the credential exposure risk. In order to make the process less troublesome, the customer may decide to store the credential persistently on the machine itself, or location where multiple machines can access it. This could further increase the risk of credential compromise. Apart from security problems, such processes do not scale for complex large workloads. The requirement for synchronized actions (e.g., creation of credential, distribution of the credential) pose serious problem for highly automated cloud workloads. Also, the process has to be repeated every time customer would like to change the credential.

Modern cloud vendors offer highly integrated IAM solutions. Compute instances, and other resources dedicated to host customer workloads such as server-less functions, have their own identity recognized by cloud IAM under customer's account. The customer may directly address these components as first-class principals, group them and grant them required access. The compute machines, functions and other components are automatically provisioned with short-lived credentials accessible to the processes they host. Applications retrieve those credentials and use them to access cloud resources.

A problem can arise when customer intends to host multiple, heterogeneous processes on a single compute instance. This is common, when compute nodes are used to run containers managed by orchestration framework such as used in commercially available container management/clustering services. The core of the problem is the fact that minimum granularity of the identity is a single machine. Just because the containers are hosted on the same machine, it does not mean that they are intended to have the same access to cloud resources. However, as the single machine is the most granular level of identity they all need to share it.

BRIEF SUMMARY

Certain embodiments of the present disclosure can provide methods, systems, and computer-readable storage medium for managing access to cloud based services. The disclosure describes systems and techniques that mediate requests between containers and the cloud service in order to provide adequate level of access control. The disclosed techniques combine an internal authentication of the cloud orchestrator to identify the container caller and cloud service authentication to authenticate calls made to cloud services. In some examples, individual containers running on the system may not get direct access to the metadata service or instance credential. Instead, the containers may send the requests through a request forwarder component. That component establishes the container identity and verifies that the specific container has the access to communicate with the target service (e.g., the cloud services). The request forwarder component uses the instance credential to authenticate the call to the target service. The compute instance can be configured in a way that prevents containers from accessing the metadata service. The technique effectively prevents processes in containers to use the compute instance credentials. Compute instances are examples of virtual processor, compute nodes in the cloud, or even bare metal processors (e.g., physical hardware computers).

When a container is initialized it can be provided with a credential by the container orchestrator. The container orchestrator can identify the container using the credential in addition to replacing nodes, replacing containers to nodes and so forth. This process can take different forms. In some instances, the process will result in a credential being stored on container's file system. According to an aspect of the disclosure, a process being executed in a container intends to make a call to a cloud service. The process can direct a request for cloud services to the request forwarder. The request can include the container credential. The request forwarder can receive the request and determine the identity of the container by sending the container credential to container orchestrator. The request forwarder can consult one or more policies stored on the system to verify that the container is allowed to access the target cloud service. The request forwarder can obtain an instance credential from the metadata service. The request forwarder can send the request to the target cloud service including compute instance credential. The cloud service can verify the request against one or more stored cloud policies to verify that the instance running in a container is allowed to access the requested cloud service.

Other embodiments are directed to systems, apparatus, and computer readable media associated with methods described herein. In one embodiment, the computer readable medium contains instructions for receiving data and analyzing data, but not instructions for directing a machine to create the data (e.g. sequencing nucleic acid molecules). In another embodiment, the computer readable medium does contain instructions for directing a machine to create the data. In one embodiment, a computer program product comprises a computer readable medium storing a plurality of instructions for controlling a processor to perform an operation for methods described herein. Embodiments are also directed to computer systems configured to perform the steps of any of the methods described herein, potentially with different components performing a respective step or a respective group of steps.

In some aspects, a method for providing access to a cloud service includes receiving a request for access to a cloud service, the request including a container credential; determining an identification of the container using the container credential; verifying that the container requesting access to the cloud service is authorized based at least in part on one or more stored policies; based at least in part on a determination that the container requesting access to the cloud services is authorized: receiving instance credential from a metadata service; including the instance credential with the request; and sending the request with the instance credential to the cloud service.

In some aspects, the method is performed by a Request Forwarder.

In some aspects, the method includes caching the instance credential for the cloud service.

In some aspects, the method includes caching the container credential.

In some aspects, the verifying is performed by accessing the one or more stored policies that define permissions for container access to the cloud service. In some aspects, the metadata service stores one or more instance credentials that are used to access the cloud service.

In some aspects, the container credential is a network-based identity credential.

In some aspects, the network-based identity credential comprises an Internet Protocol (IP) address for the container.

In some aspects, a non-transitory computer-readable medium storing a set of instructions includes: one or more instructions that, when executed by one or more processors of a computer system, cause the computer system to perform operations to: receive a request for access to a cloud service, the request including a container credential; determine an identification of the container using the container credential; verify that the container requesting access to the cloud service is authorized based at least in part on one or more stored policies; based at least in part on a determination that the container is authorized: receive instance credential from a metadata service; include the instance credential with the request; and send the request with the instance credential to the cloud service.

In some aspects, the operations are performed by a Request Forwarder.

In some aspects, the one or more instructions further cause the computer system to cache the instance credential for the cloud service.

In some aspects, the one or more instructions further cause the computer system to cache the container credential.

In some aspects, wherein the verifying is performed by accessing the one or more stored policies that define permissions for container access to the cloud service. In some aspects, the metadata service stores one or more instance credentials that are used to access the cloud service.

In some aspects, the container credential is a network-based identity credential.

In some aspects, the network-based identity credential comprises an Internet Protocol (IP) address for the container.

In some aspects, a cloud based system includes: one or more memories; and one or more processors, communicatively coupled to the one or more memories, configured to perform operations to: receive a request for access to a cloud service, the request including a container credential; determine an identification of the container using the container credential; verify that the container requesting access to the cloud service is authorized based at least in part on stored policies; based at least in part on a determination that the container requesting access to the cloud service is authorized: receive instance credential from a metadata service; include the instance credential with the request; and send the request to the cloud service.

In some aspects, the operations are performed by a Request Forwarder.

In some aspects, the one or more processors are further configured to cache the instance credential for the cloud service.

In some aspects, the one or more processors are further configured to cache the container credential.

In some aspects, the verifying is performed by accessing the one or more stored policies that define permissions for container access to the cloud services. In some aspects, the metadata service stores one or more instance credentials that are used to access the cloud service.

In some aspects, the container credential is a network-based identity credential.

Reference to the remaining portions of the specification, including the drawings and claims, will realize other features and advantages of disclosed embodiments. Further features and advantages, as well as the structure and operation of various examples of the present disclosure, are described in detail below with respect to the accompanying drawings. In the drawings, like reference numbers can indicate identical or functionally similar elements.

These and other embodiments are described in detail below. For example, other embodiments are directed to systems, devices, and computer readable media associated with methods described herein.

A better understanding of the nature and advantages of embodiments of the present disclosed may be gained with reference to the following detailed description and the accompanying drawings.

DETAILED DESCRIPTION

I. Introduction

Figure 1:
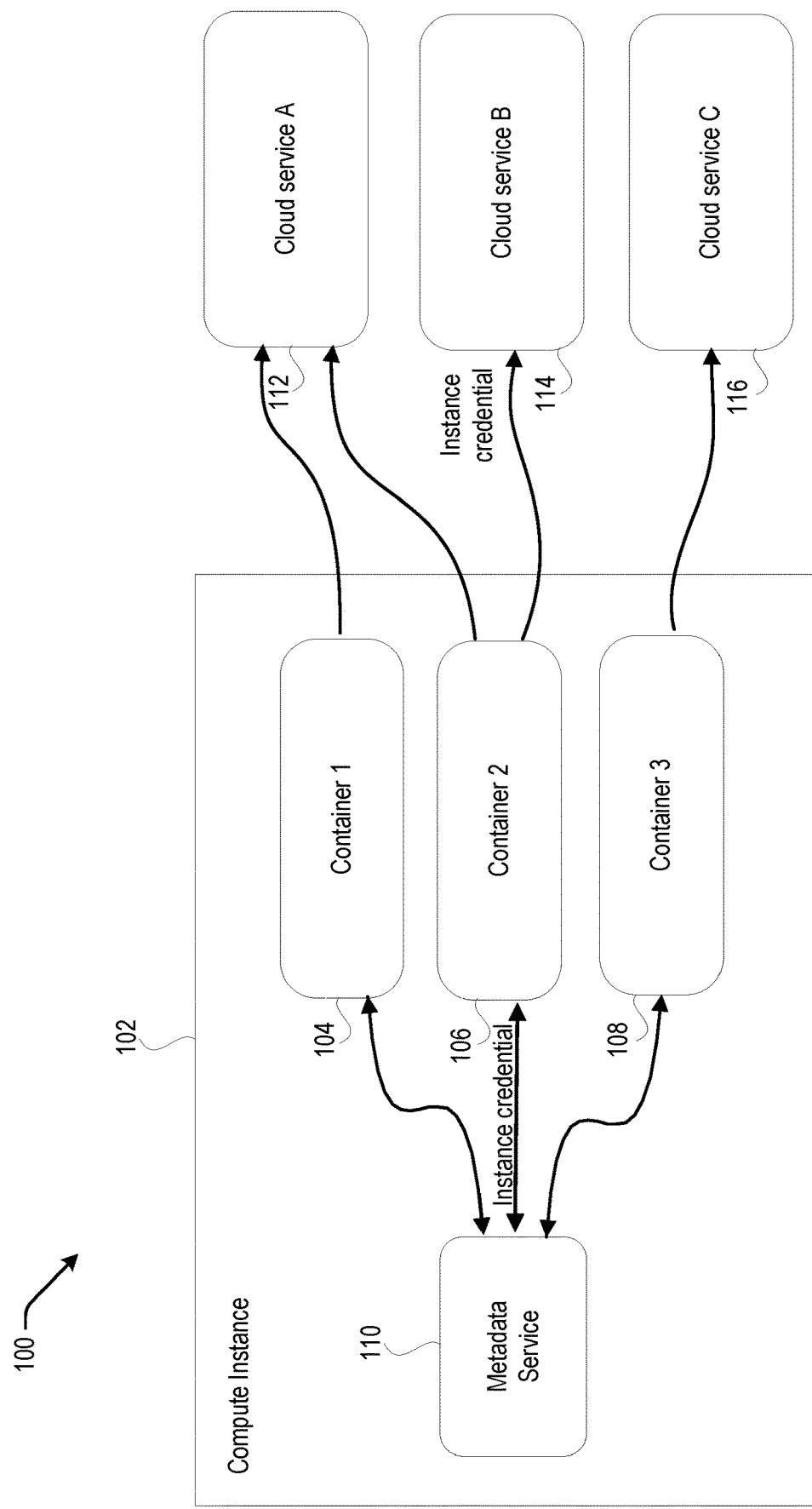
FIG. 1 illustrates a logical construct for an example cloud network architecture.

Certain embodiments of the present disclosure can provide methods, systems, and computer-readable medium for managing access to cloud based services. The disclosure describes systems and techniques that mediate requests between containers and the cloud service in order to provide adequate level of access control. The disclosed techniques combine an internal authentication of the cloud orchestrator to identify the container caller and cloud service authentication to authenticate calls made to cloud services. In some examples, individual containers running on the system may not get direct access to the metadata service or instance credential. Instead, the containers may send the requests through a request forwarder component. That component establishes the container identity and verifies that the specific container has the access to communicate with the target service. The request forwarder component uses the instance credential to authenticate the call to the target service. The compute instance can be configured in a way that prevents containers from accessing the metadata service. The technique effectively prevents processes in containers to use the compute instance credentials.

When a container is initialized, it can be provided with a credential by the container orchestrator. This process can take different forms but most typically will result in a credential being stored on container's file system. According to an aspect of the disclosure, a process being executed in a container intends to make a call to a cloud service. The process can direct a request for cloud services to the request forwarder. The request can include the container credential. The request forwarder can receive the request and determine the identity of the container by sending the container credential to container orchestrator. The request forwarder can consult one or more policies stored on the system to verify that the container is allowed to access the target cloud service. The request forwarder can obtain an instance credential from metadata service. The request forwarder can send the request to the target cloud service including compute instance credential. The cloud service can verify the request against the cloud policy to verify that the instance is allowed to perform given operation in by the cloud service.

For the purpose of this disclosure, an instance (e.g., compute instance) is a hosted server that is running either in the Customer Enclave (available publicly) or Service Enclave. If it directly accesses the hardware that it runs on, it can be considered a bare metal instance. If there is a hypervisor between the instance, it can be considered a virtual instance.

For the purpose of this disclosure, a container is a collection of schemas, objects, and related structures in a multitenant container database (CDB) that appears logically to an application as a separate database. Within a CDB, each container has a unique ID and name. The root and every pluggable database (PDB) is considered a container. PDBs isolate data and operations so that from the perspective of a user or application, each PDB appears as if it were a traditional non-CDB.

FIG. 1 illustrates a logical construct for an example cloud network architecture 100. The cloud network architecture can include one or more containers (e.g., Container 1 104, Container 2 106, and Container 3 108). In an implementation, the compute instance 102 can include a locally accessible network service, commonly referred to as metadata service 110. This metadata service 110 allows local workloads on the system to access various information propagated by the cloud vendor, including the credential for the principal representing the compute instance 102. The metadata service 110 can be accessible only to the processes running on this specific machine. A process can contact the metadata service 110 to obtain the credential and use that credential to access other cloud services (e.g., Cloud Service A 112, Cloud Service B 114, or Cloud Service C 116). The services use the cloud vendor's identity access management (IAM) service to verify that the principal, representing the instance, has access to perform the requested cloud operation.

A problem can arise when a customer intends to host multiple, heterogeneous processes on a single compute instance 102. This can be common, when compute nodes are used to run containers managed by an orchestration framework (e.g., such as a container management/clustering service or the like). The problem can be that minimum granularity of the identity is a single machine. Previous techniques may have just assigned access to one or more cloud services to the machine not necessarily different containers located on the same machine. Just because the containers are hosted on the same machine, it does not mean that they are intended to have the same access to cloud resources. However, as the single machine is the most granular level of identity, they all need to share it.

For example, as depicted in FIG. 1. Container 1 104 only communicates with the Cloud service A 112. Container 2 106 communicates with Cloud service A 112 and Cloud Service B 114. Container 3 108 communicates with Cloud service C 116. In one arrangement, a customer can accept the risk of nodes having access to cloud services that were not intended. In this arrangement, the compute nodes are granted all the access that any container they host may need, with all containers receiving access node credentials. This approach effectively compromises security for convenience. For example, the arrangement shown in FIG. 1, compute instance 102 can be provided access to Cloud Service A 112, Cloud Service B 114, and Cloud Service C 116. As an example, processes running on Container 1 104 may be prohibited from accessing Cloud Service C 116 potentially because the service belongs to a competitor entity. If access is only controlled by the computing instance, the processes running in Container 1 104 may inadvertently gain access to Cloud Service C 116 because the compute instance 102 provided permissions for all containers to access all three cloud services illustrated.

In a second arrangement, a customer can selectively disable metadata service 110 access to some containers. In this arrangement, containers that do not need access to any cloud resources can be forbidden access to metadata service 110. This can be simple to implement, but is an all or nothing approach. This arrangement is not helpful for containers having different access needs. So using firewall rules or network policies, a user may decide to only allow this container to access that metadata service network wide. And this works only if that container needs access to any services. So one can at least isolate components that do not need access to any cloud services by breaking the path for the containers to obtain a credential.

In a third arrangement, a customer can distribute containers to separate machines. In this arrangement, a customer may create a group of compute nodes and grant each group different access. A customer can subsequently configure the container orchestrator to place the containers on nodes with access that matches needs for each container. The nodes can be placed into different groups. The groups assign those nodes different access and then configure the scheduler in the container orchestrator to only assigned specific containers to specific nodes. This approach works in limited cases, but the more one needs to do it the more fragmented the set of machines becomes and the more a user is losing out on machines and overall the workload density suffers. This arrangement provides containers with tailored access to cloud resources. However, this arrangement can be more complicated and requires careful planning and mapping policies to nodes and nodes to containers, may result in poor utilization of resources.

A customer may also use any combination of these options, increasing the complexity of access management. The disadvantages of the above-mentioned solutions increase with the size and complexity of the workload, in particular number of different containers and their cloud service access needs. Accepting the risk will result in increasingly larger access given to individual containers, even though they may not need it. Distributing large number of containers may result in an increasingly larger number of different machines required and complexity in finding the right set of access needed on each node. At the extreme, a customer may decide to have a pool of machines for every container type which will provide perfect access restrictions, but undermine the very purpose of using container management service and greatly increase the cost due to low process density.

Some providers, such as commercially available container management/clustering services, provide support for containers (e.g., a pod) with its own type of principal in their managed service. As such, access can be granted directly to the containers themselves rather than relying on the metadata service 110. While this may be a useful solution, it is limited to that vendor and the vendor's specific service. A customer who intends to manage their own cluster, or wants to use a different framework will not be able to implement this solution.

II. Logical Construct for Cloud Network Architecture

Figure 2:
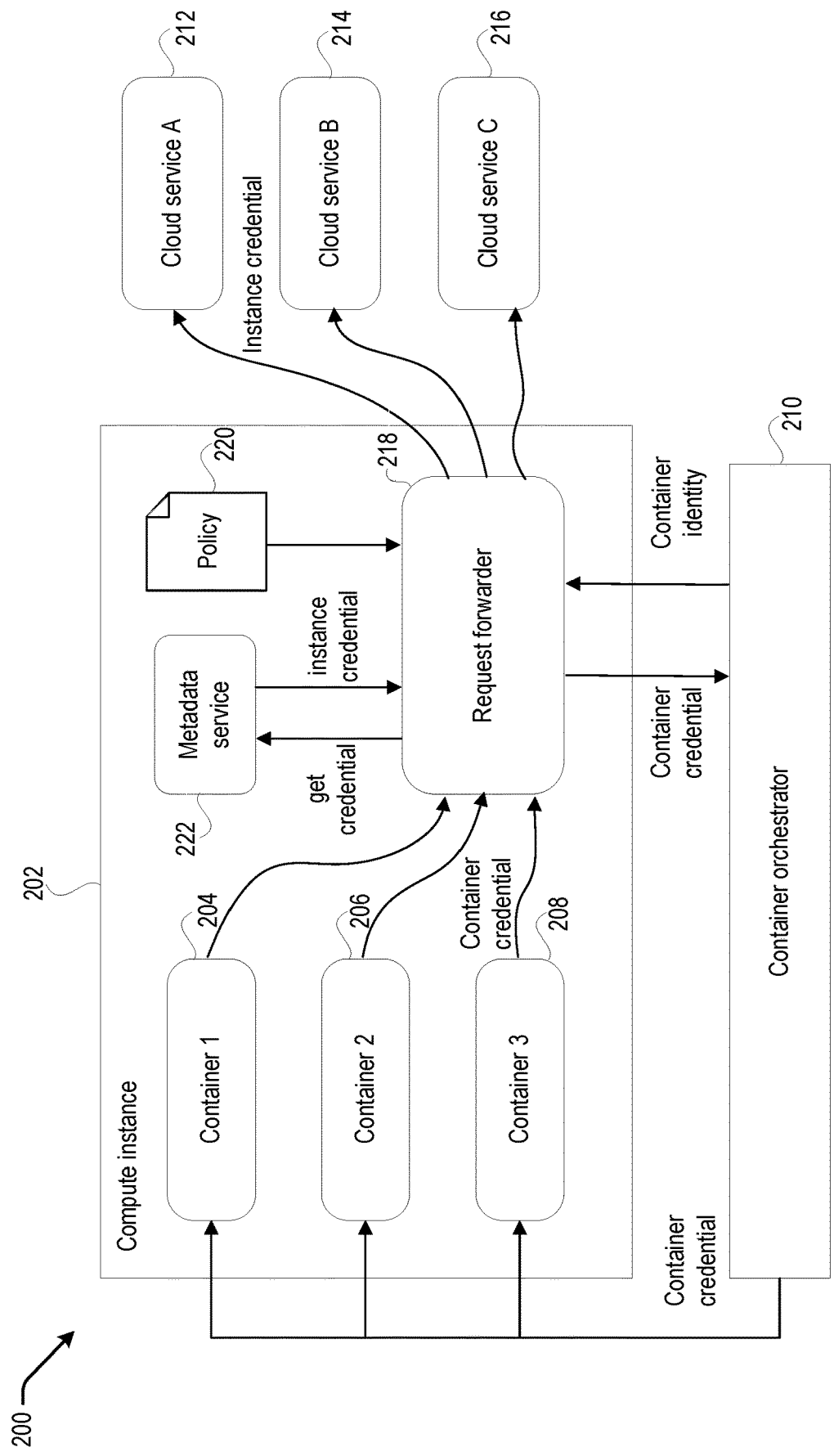
FIG. 2 illustrates a logical construct for a second example cloud network architecture.

FIG. 2 illustrates a logical construct for a second cloud network architecture 200. In the second network architecture 200, the compute instance 202 can include one or more containers (e.g., Container 1 204, Container 2 206, and Container 3 208). Each of the containers can receive a credential to identity to the container on the network. In various examples, a container orchestrator 210 can provide the identity to the container upon creation. The container identity can be stored in memory for the container.

As previously discussed for FIG. 1, a process being executed in a container of the compute instance 202 can request cloud services (e.g., Cloud Service A 212, Cloud Service B 214, or Cloud Service C 216). The container can send its container credential to a Request Forwarder 218. The Request Forwarder 218 acts as a proxy between containers and cloud services. The Request Forwarder 218 is responsible for obtaining credentials so that component on the machine can call with the instance credential to cloud services which allows the network architecture to disconnect all of those containers from accessing that credential. So those containers do not have that credential and now the containers have to make all the calls through the Request Forwarder 218 because that is the only way to get a credential. The Request Forwarder 218 can receive the request from the container including the container credential. The Request Forwarder 218 can verify the credential with the Container Orchestrator 210 in the control plane. The Request Forwarder 218 can send the container credential to the Container Orchestrator 210 and receive back the container identity.

The Request Forwarder 218 can receive policy information 220. The policy information 220 can be used to determine which cloud services, if any, the container is permitted to use. The Request Forwarder 218 can use this information to determine permissions for the container. The Request Forwarder 218 can request instance credential from the metadata server 222. The metadata server 222 can send instance credential information based on the policy information 220 for the container. The Request Forwarder 218 can send the request to the cloud services (e.g., Cloud Service A 212, Cloud Service B 214, or Cloud Service C 216). The instance credential can be attached to the request sent to the cloud services.

This technique has benefits over other commercial solutions (e.g., a container management/clustering service). One benefit is to resolve a vendor log in problem. Techniques that depend on particular vendor solutions can be provided a cloud provider identity. These solutions depend on that identity for service security and locks the customer into using that cloud provider that offers that facility. For example, if a process incorporates the case coordinated service (e.g., container management/clustering service), the user will not be able to use a custom version for whatever reason. A user may want to use another container orchestrator that is not offered from the cloud vendor and may want to migrate the cloud workload between clouds. In this way the network becomes an obstruction obstructed by that framework. So one advantage is that a user can still use different cloud service providers that do not necessarily have that an implementation such as existing commercial solutions. So another advantage over existing system is the ability to can change the policies on the fly so a network administrator can just change the policies such that the Request Forwarder 218 changes based on the requests that are coming in.

Figure 3:
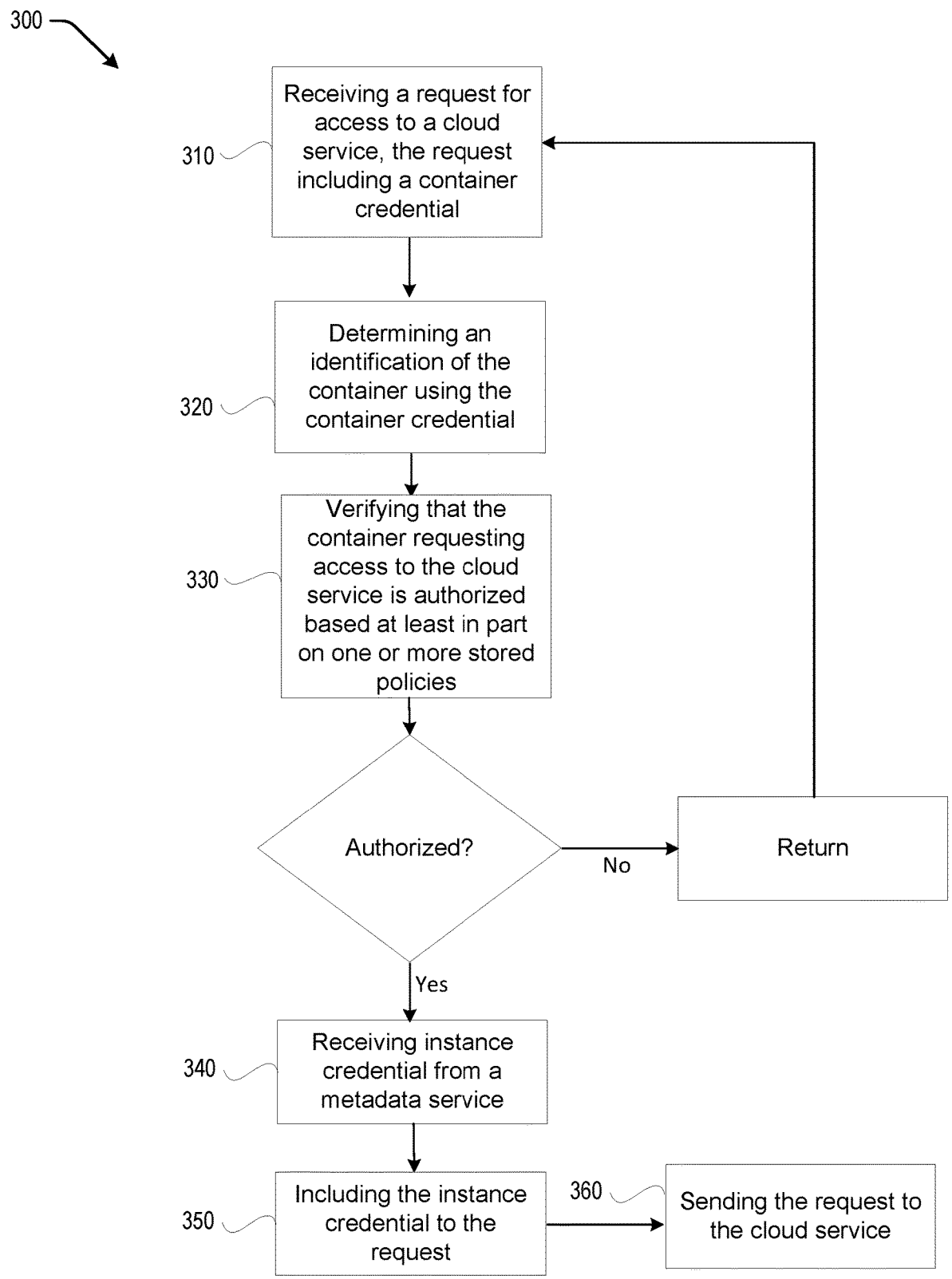
FIG. 3 illustrates an example flow for a technique for selective container access to cloud services based on hosting node.

FIG. 3 is a flowchart of an example process 400 associated with a technique for selective container access to cloud services. In some implementations, one or more process blocks of FIG. 3 may be performed by a computer system (e.g., computer system 1000 of FIG. 10). Additionally, or alternatively, one or more process blocks of FIG. 3 may be performed by one or more components of device 1000, such as processor 1004, memory 1010, storage subsystem 1018, input/output subsystem 1008, and/or communications subsystem 1024.

As shown in FIG. 3, process 300 may include receiving a request for access to a cloud service, the request including a container credential (block 310). For example, the computer system may receive a request for access to the cloud service, the request including a container credential (e.g., an alpha or numeric code associated with the container), as described above.

As further shown in FIG. 3, process 300 may include determining an identification of the container using the container credential (block 320). For example, the computer system may determine an identification of the container using the container credential, as described above.

As further shown in FIG. 3, process 300 may include verifying that the container requesting access to the cloud service is authorized based at least in part on one or more stored policies (block 330). For example, the computer system may verify that the container requesting access to the cloud service is authorized based at least in part on one or more stored policies, as described above.

As further shown in FIG. 3, process 300 may include basing on a determination that the container is authorized: receiving instance credential from a metadata service (block 340). For example, the computer system may base on a determination that the container is authorized: receiving instance credential (e.g., an alpha or numeric code) from a metadata service, as described above. The credential can be ephemeral but valid for some period of time. Those credentials in the metadata service will typically return a credential with some information about the validity of that credential. For example, the credential can expire in a set period of time (e.g., six hours).

As further shown in FIG. 3, process 300 may include receiving instance credential from a metadata service (block 350). For example, the computer system may receive instance credential from a metadata service, as described above.

As further shown in FIG. 3, process 300 may include including the instance credential with the request (block 360).

As further shown in FIG. 3, process 300 may include sending the request to the cloud service (block 370). For example, the computer system may send the request to the cloud service, as described above.

Process 300 may include additional implementations, such as any single implementation or any combination of implementations described below and/or in connection with one or more other processes described elsewhere herein.

In a first implementation, a container orchestrator performs the determining the identification of the container using the container credential.

In a second implementation, alone or in combination with the first implementation, process 300 includes caching the instance credential for the cloud service.

In a third implementation, alone or in combination with one or more of the first and second implementations, process 300 includes caching the container credential. Request Forwarder can cache a container's credential to map to its identity. So if a container sends a credential (e.g., an opaque token) and the Request Forwarder cannot examine that credential to find out who it is to verify if this credential is valid. But if it is assumed the container will keep sending the same credential then the information about what the credential maps to can be cached. If the Request Forwarder receives an opaque token, it can receive it again or cache it in some look up table that provides that this long string is container 1. In this way, it performs that transition much faster. As there are some additional steps, this expiry time can be obtained so the Request Forwarder knows how long the credential is valid for. If this is not done, the system would need to eventually expire that cache and that container may no longer be there, that credential may be stolen one would not want to keep it and be using it forever.

In a fourth implementation, alone or in combination with one or more of the first through third implementations, process 300 includes automatically redirecting the request for access to the cloud service from a request forwarder. Developers may not want to know about the existence of the Request Forwarder. The Request Forwarder may include a rule that redirects all the traffic to all the known cloud services within the vendor which has known information that can be obtained from the cloud vendor. All the traffic that goes to those set of IP addresses that is coming from all the containers running on a machine goes to Cloud Service B. In which case the container wants to address the traffic to Cloud Service B for example, but actually is sent to the request forwarder which makes this from the container point of view transparent and makes it also more portable.

In a fifth implementation, alone or in combination with one or more of the first through fourth implementations, the container credential is a network-based identity. When a container orchestrator creates containers it can assign them addresses by creating a software defined network and each of those containers, even though they share a machine, all have private networks based on private network interfaces with a separate network main space and within that main space they get IP addresses. Even though the container share a machine they can have all unique IP addresses. These addresses may not be known at front so the container orchestrator can assign them based on whatever addresses are available (e.g., virtual addresses). These addresses may not be real routable IP addresses. The Container Orchestrator can keep track of what addresses each container received. The container credential can be cached for some time, but many orchestrators also provide a mechanism to subscribe to events.

In some embodiments, every time there is a change to IP address mapping, the information can be sent to the Request Forwarder. The Request Forwarder running on that instance can keep track of all the IP addresses that are running on that instance. In which case it has this information available when the request comes in.

In a sixth implementation, alone or in combination with one or more of the first through fifth implementations, the network-based identity comprises an Internet Protocol (IP) address for the container.

Although FIG. 3 shows example blocks of process 300, in some implementations, process 300 may include additional blocks, fewer blocks, different blocks, or differently arranged blocks than those depicted in FIG. 3. Additionally, or alternatively, two or more of the blocks of process 300 may be performed in parallel.

In various examples, there is a Request Forwarder on each instance. However, that is not required. In some embodiments, the request forwarder can reside on a different machine from the container. In some embodiments, some machines have access to cloud services and other do not. In various examples, the machines can be arranged in groups with each Request Forwarder appropriately directing authorized traffic to various cloud services.

This disclosure describes a system that mediates requests between containers and the cloud service in order to provide adequate level of access control. It combines an internal authentication of the cloud orchestrator to identify the container caller and cloud service authentication to authenticate calls made to cloud services.

This implementation is based on a system in which individual containers running on the system never get a direct access to the metadata service or instance credential. Instead, the containers send request for cloud services through a request forwarder component. That component establishes the container identity and verifies that the specific container is authorized to access to communicate with the target service. The request forwarder uses the instance credential to authenticate the call to the target service.

In various examples, the Request Forwarder can cache the instance credential. The Metadata service contains the instance credentials. These instance credentials are required to make use of any of the cloud services available to the instance. In the operation presented earlier in this document, the request forwarder would receive a request from a container. After verifying the identity of said container the request forwarder then calls the metadata service to obtain the instance credential. Instead of doing this, the request forwarder can just cache the instance credential. This way if one request comes in soon after the other the request forwarder does not have to reach out to the metadata service to obtain the instance credentials. The containers identity would still need to be verified.

An implementation could involve the compute instance credentials having a known expiry time. This may be either a property of the credential itself (in case of X.509 certificates) or it could be provided together with the credential. Aware of the expiry time, the request forwarder may cache the credential for the optimal amount of time, as well as preemptively fetch a newer version before the expiry.

In various examples, a Request forwarder can cache a containers credential to map to its identity. A container sends its container credentials to the request forwarder when attempting to make any request. When the request forwarder receives this credential, it forwards it to the container orchestrator to verify the identity of the container. The container identity is returned to the forwarder. The request forwarder can cache this response along with the container credential. Hence if the same container were to make another request, its identity could be verified without reaching out to the container orchestrator. The container credentials caching can be optimized, similar to the instance credentials. Also, to reduce the risk of stolen credential being reused beyond the lifetime of the container, the request forwarder may perform more frequent credential verification than its expiry time.

In various examples, the system can perform automatic request redirection. The cluster can be configured to automatically redirect the traffic directed to cloud services. Such implementation makes the request forwarding process transparent to the client container. Many container orchestrators allow configuration that automatically routes the selected traffic.

In various examples, the container credential can be a network-based identity. The sample embodiment involves using a credential supplied by the container orchestrator. This requires active cooperation of the process within a container to include the credential in the outgoing calls to the cloud service. Many container orchestration frameworks also manage network configuration of the underlying containers in such a way that the specific container can be uniquely identified by its IP address. In such frameworks, the source IP address of the outgoing call could be used by the request forwarder to identify the container.

The container orchestrator, during deployment keeps track of what IP address belongs to which container. With this information in hand, when the request forwarder wants to verify the identity of the container, it forwards the IP address to the Container orchestrator and receives the identity in return. Also, to remove the need for synchronous verification, the request forwarder can subscribe to events related to network identity of containers to have that information always available.

III. Centralized Request Forwarder

Figure 4:
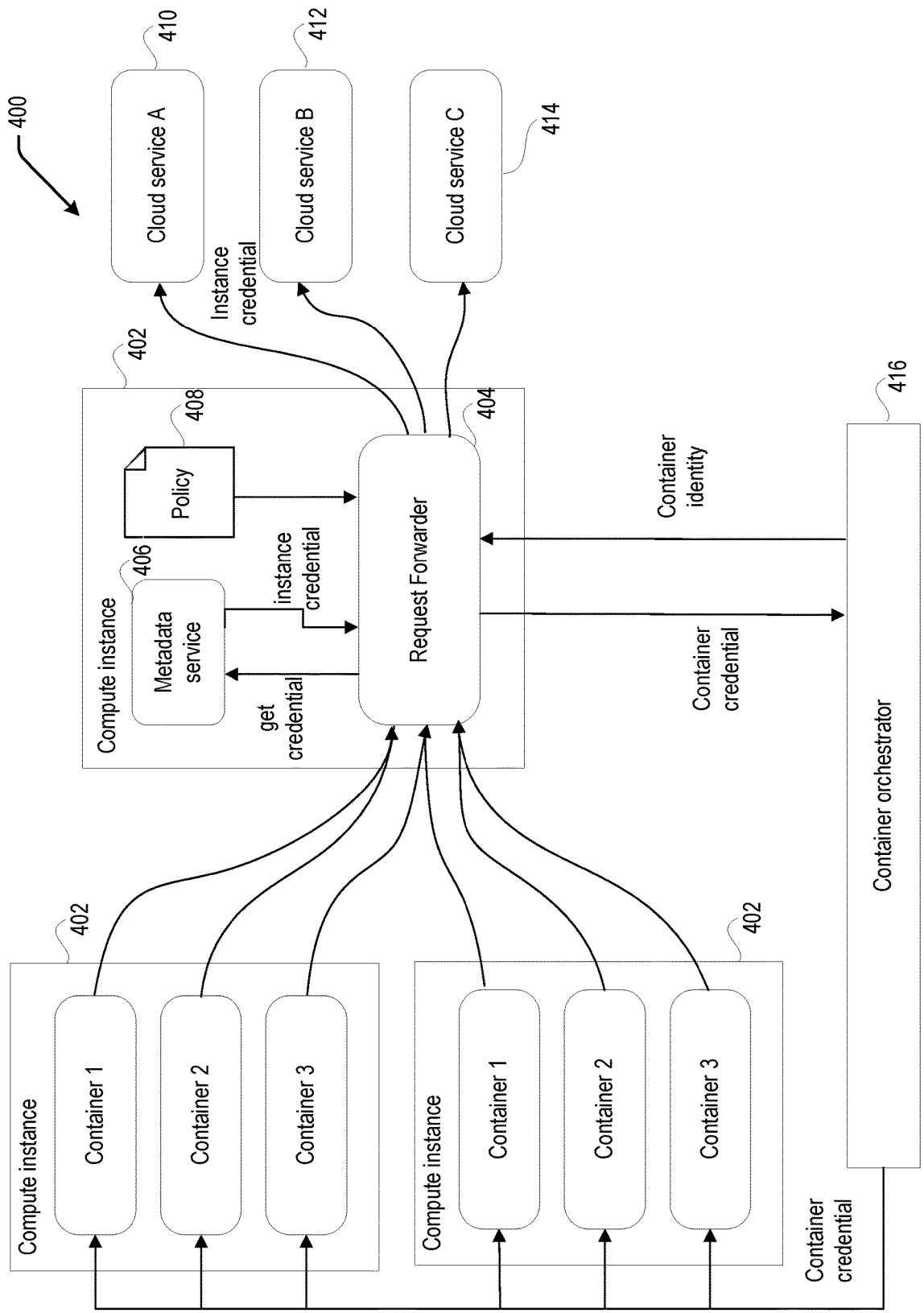
FIG. 4 illustrates a logical construct for a third example cloud network architecture.

FIG. 4 illustrates a logical construct for a third exemplary cloud network architecture 400. The cloud network architecture 400 can include multiple compute instances 402. One or more compute instances 402 can store various containers. Another separate compute instance 402 can include a Request Forwarder 404, a Metadata Service 406, and one or more policies 408. The cloud network architecture 400 can include various cloud services (e.g., Cloud Service A 410, Cloud Service B 412, and Cloud Service C 414). The cloud network architecture 400 can also include a Container Orchestrator 416. The Request Forwarder 404 can be either centralized for multiple nodes or each node can have its own Request Forwarder 404. The centralized/dedicated Request Forwarder 404 node implies that different nodes (that may contain multiple containers) can forward their requests to the cloud services via a centralized node. The instance credentials do not need to be stored on every node, only on the node on which the request forwarder is present.

There are pros and cons for both of these architectures. The centralized/dedicated Request Forwarders 404, the nodes' resources can be dedicated to just performing the duties of the request forwarder while other nodes can focus on using their resources to perform their tasks. Apart from this, the instance credentials need not be stored on every node, just on a centralized instance. However the drawback of this approach can be that the centralized Request Forwarder 404 acts as a single point of failure. If it goes down, none of the containers can make requests to the cloud. services. As for having the Request Forwarder 404 on every node, the network rules/architecture will be much simpler to create and get functioning. Another advantage of the per-node forwarder would be that each node has its own Request Forwarder 404, resulting in each node only processing the workload for its containers. One disadvantage of this design is that per node credentials must be maintained for access to cloud services. This makes the issue of proper key rotation and revocation harder by a factor of the number of nodes involved. A hybrid approach may involve using a subset of cluster nodes to host the Request Forwarder 404.

IV. Example Embodiment Using Container Management/Clustering Service

Disclosed techniques can be implemented in different container orchestration frameworks. For example, the disclosed techniques can be implemented using commercially available container management/clustering services.

The Request Forwarder 404 may be implemented as a Pod, operating in the cluster itself. This way, the Request Forwarder 404 can access the container management/clustering service control plane using its own credential. The Request Forwarder 404 may be deployed as a DaemonSet, to ensure that it is enabled on every node, or on nodes with a specific label. The containers, making requests to the cloud service are also Pods. A Network Policy may be specified to block the access of any pods other than Request Forwarder 404 to metadata service. This can be done either through deployment package that contains the Request Forwarder 404, such as a Helm Chart, or by Request Forwarder 404 itself An alternative enablement mechanism may involve Mutating Admission Webhook, set up by the Request Forwarder 404, which instruments every Pod at deployment time to add the blocking rule. In addition, the network forwarding rules that route the traffic from the container to Request Forwarder 404 may be set up by the admission web hook, or by an Init Container that is added to every pod by the web hook.

The container identity in the commercially available container management/clustering service can be a service account that is assigned to specific Pods. The credential identifying a service is distributed automatically to all the pods on a virtual file system. The process in the pod can use that credential when making outbound call to a cloud service.

If network-level identity is being used, the Request Forwarder 404 can subscribe to receive pod information. In this case, the pod, or a specific set of pod labels could be used to define the policies. When receiving a call from the pod, request forwarded identifies the pod, or corresponding set of labels from the status of the cluster.

V. Request Forwarder as a Service

The request forwarder can be also deployed as an independent service outside of a particular cluster. Such service can be shared by multiple clusters. As this embodiment introduces a third party (in addition to cluster owner and cloud provider) it requires trusted relationship between the parties.

Figure 5:
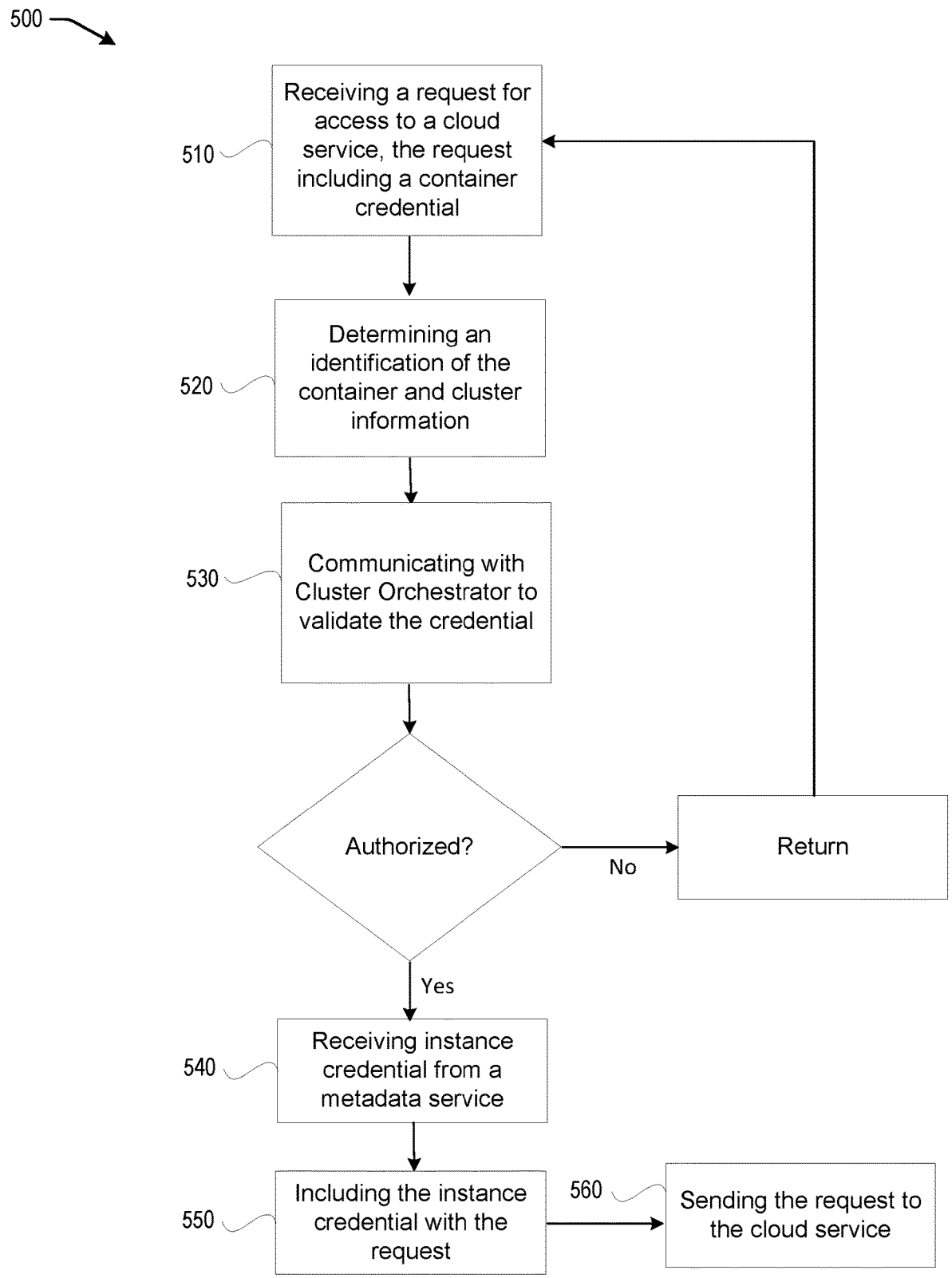
FIG. 5 is a simplified flow for a technique for a technique for selective container access to cloud services based on hosting node using request forwarder as a service.

FIG. 5 is a flowchart of an example process 500 associated with a technique for selective container access to cloud services using Request Forwarder as a service. In some implementations, one or more process blocks of FIG. 5 may be performed by a computer system (e.g., computer system 1000 of FIG. 10). Additionally, or alternatively, one or more process blocks of FIG. 5 may be performed by one or more components of device 1000, such as processor 1004, memory 1010, storage subsystem 1018, input/output subsystem 1008, and/or communications subsystem 1024.

As shown in FIG. 5, process 500 may include receiving a request for access to a cloud service, the request including a container credential (block 510). For example, the computer system may receive a request for access to a cloud service via a process running on a container for a compute instance. The request can include a container credential, as described above. The request can be sent to the cloud service and redirected to the Request Forwarder service.

As further shown in FIG. 5, process 500 may include determining an identification of the container and cluster that the container belongs to (block 520). For example, the computer system may determine an identification of the container and cluster using the container credential, as described above. Alternatively, the specific cluster information can be indicated in some other form, for example through specific endpoint provided by the Request Forwarder.

As further shown in FIG. 5, process 500 may include communicating with Cluster Orchestrator to validate the credential (block 530). For example, the computer system may verify that the container requesting access to the cloud service is authorized based at least in part on one or more stored policies, as described above. The request forwarder, having both the cluster information as well as the credential, communicates with cluster orchestrator to validate the credential.

As further shown in FIG. 3, process 500 may include basing on a determination that the container is authorized: receiving instance credential from a metadata service (block 540).

As further shown in FIG. 5, process 500 may include including the instance credential with the request (block 550).

As further shown in FIG. 5, process 500 may include sending the request to the cloud service (block 560).

Process 500 may include additional implementations, such as any single implementation or any combination of implementations described below and/or in connection with one or more other processes described elsewhere herein.

In a first implementation, the method can be performed by a Request Forwarder.

In a second implementation, alone or in combination with the first implementation, process 500 includes caching the instance credential for the cloud service.

In a third implementation, alone or in combination with one or more of the first and second implementations, process 500 includes caching the container credential.

In a fourth implementation, alone or in combination with one or more of the first through third implementations, the verifying is performed by accessing the one or more stored policies that define permissions for container access to the cloud service. The metadata service can store the one or more instances that are used to access the cloud service.

In a fifth implementation, alone or in combination with one or more of the first through fourth implementations, the container credential is a network-based identity credential.

In a sixth implementation, alone or in combination with one or more of the first through fifth implementations, the network-based identity credential comprises an Internet Protocol (IP) address for the container.

Although FIG. 5 shows example blocks of process 500, in some implementations, process 500 may include additional blocks, fewer blocks, different blocks, or differently arranged blocks than those depicted in FIG. 3. Additionally, or alternatively, two or more of the blocks of process 500 may be performed in parallel.

Depending on the arrangement of components, and trust relationship between the parties involved, there could be multiple options for how the request forwarder will authenticate to the cloud service on behalf of the container. If the request forwarder service is operated by the same organization that operates multiple clusters, the service is trusted and may be simply granted permission to access cloud service as yet another element of their infrastructure (such as compute instance). If the request forwarded is operated by a third party, the cluster owner will require to explicitly grant that third party access to their resources in cloud service. The requirement of trust is a disadvantage of this approach, but no need to maintain the request forwarder may be attractive enough for this embodiment to be chosen by some users.

As noted above, infrastructure as a service (IaaS) is one particular type of cloud computing. IaaS can be configured to provide virtualized computing resources over a public network (e.g., the Internet). In an IaaS model, a cloud computing provider can host the infrastructure components (e.g., servers, storage devices, network nodes (e.g., hardware), deployment software, platform virtualization (e.g., a hypervisor layer), or the like. In some cases, an IaaS provider may also supply a variety of services to accompany those infrastructure components (e.g., billing, monitoring, logging, security, load balancing and clustering, etc.). Thus, as these services may be policy-driven, IaaS users may be able to implement policies to drive load balancing to maintain application availability and performance.

In some instances, IaaS customers may access resources and services through a wide area network (WAN), such as the Internet, and can use the cloud provider's services to install the remaining elements of an application stack. For example, the user can log in to the IaaS platform to create virtual machines (VMs), install operating systems (OSs) on each VM, deploy middleware such as databases, create storage buckets for workloads and backups, and even install enterprise software into that VM. Customers can then use the provider's services to perform various functions, including balancing network traffic, troubleshooting application issues, monitoring performance, managing disaster recovery, etc.

In most cases, a cloud-computing model will require the participation of a cloud provider. The cloud provider may, but need not be, a third-party service that specializes in providing (e.g., offering, renting, selling) IaaS. An entity might also opt to deploy a private cloud, becoming its own provider of infrastructure services.

In some examples, IaaS deployment is the process of putting a new application, or a new version of an application, onto a prepared application server or the like. It may also include the process of preparing the server (e.g., installing libraries, daemons, etc.). This is often managed by the cloud provider, below the hypervisor layer (e.g., the servers, storage, network hardware, and virtualization). Thus, the customer may be responsible for handling (OS), middleware, and/or application deployment (e.g., on self-service virtual machines (e.g., that can be spun up on demand) or the like.

In some examples, IaaS provisioning may refer to acquiring computers or virtual hosts for use, and even installing needed libraries or services on them. In most cases, deployment does not include provisioning, and the provisioning may need to be performed first.

In some cases, there are two different problems for IaaS provisioning. First, there is the initial challenge of provisioning the initial set of infrastructure before anything is running. Second, there is the challenge of evolving the existing infrastructure (e.g., adding new services, changing services, removing services, etc.) once everything has been provisioned. In some cases, these two challenges may be addressed by enabling the configuration of the infrastructure to be defined declaratively. In other words, the infrastructure (e.g., what components are needed and how they interact) can be defined by one or more configuration files. Thus, the overall topology of the infrastructure (e.g., what resources depend on which, and how they each work together) can be described declaratively. In some instances, once the topology is defined, a workflow can be generated that creates and/or manages the different components described in the configuration files.

In some examples, an infrastructure may have many interconnected elements. For example, there may be one or more virtual private clouds (VPCs) (e.g., a potentially on-demand pool of configurable and/or shared computing resources), also known as a core network. In some examples, there may also be one or more security group rules provisioned to define how the security of the network will be set up and one or more virtual machines (VMs). Other infrastructure elements may also be provisioned, such as a load balancer, a database, or the like. As more and more infrastructure elements are desired and/or added, the infrastructure may incrementally evolve.

In some instances, continuous deployment techniques may be employed to enable deployment of infrastructure code across various virtual computing environments. Additionally, the described techniques can enable infrastructure management within these environments. In some examples, service teams can write code that is desired to be deployed to one or more, but often many, different production environments (e.g., across various different geographic locations, sometimes spanning the entire world). However, in some examples, the infrastructure on which the code will be deployed must first be set up. In some instances, the provisioning can be done manually, a provisioning tool may be utilized to provision the resources, and/or deployment tools may be utilized to deploy the code once the infrastructure is provisioned.

Figure 6:
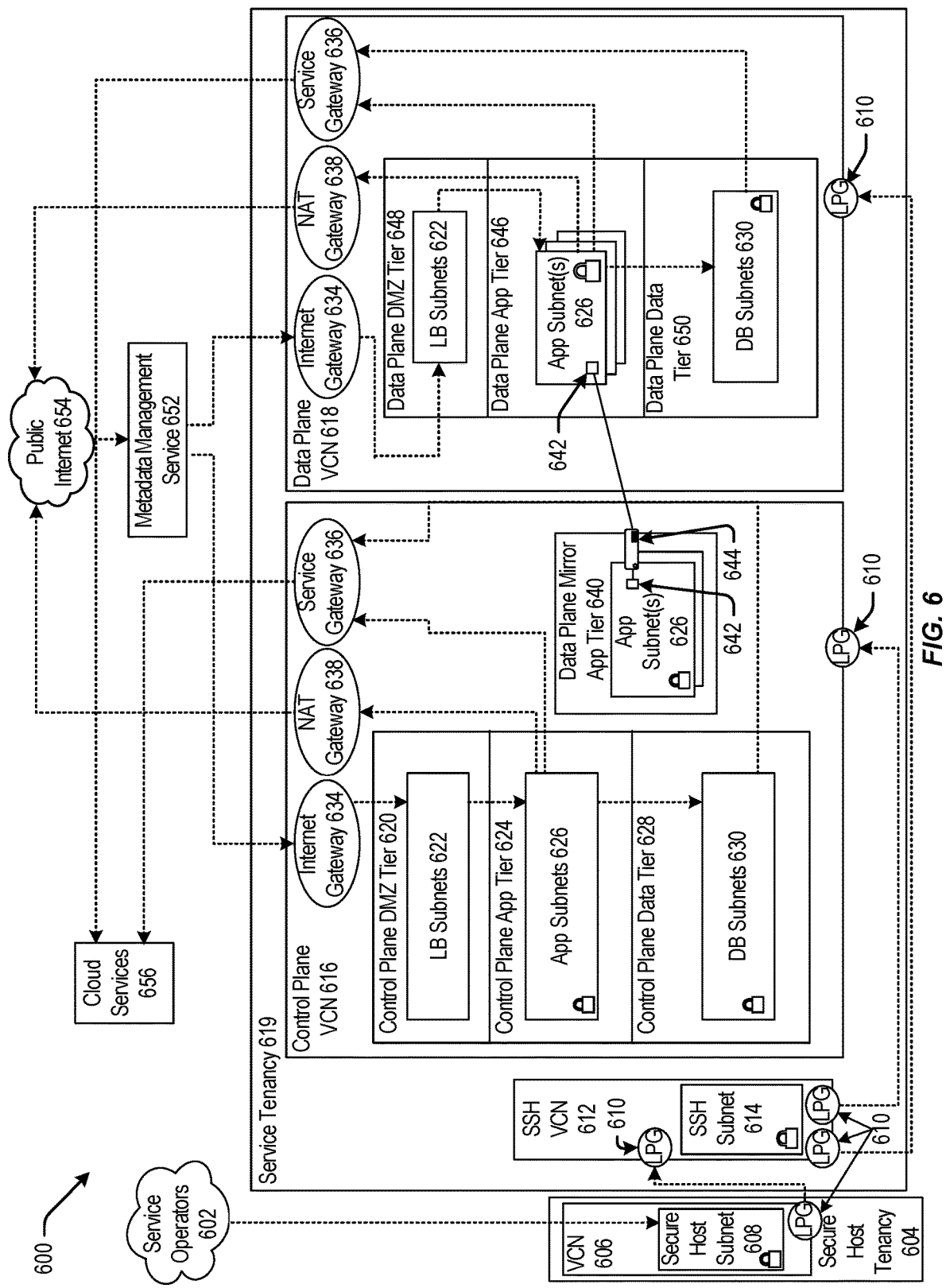
FIG. 6 is a block diagram illustrating one pattern for implementing a cloud infrastructure as a service system, according to at least one embodiment.

FIG. 6 is a block diagram 600 illustrating an example pattern of an IaaS architecture, according to at least one embodiment. Service operators 602 can be communicatively coupled to a secure host tenancy 604 that can include a virtual cloud network (VCN) 606 and a secure host subnet 608. In some examples, the service operators 602 may be using one or more client computing devices, which may be portable handheld devices (e.g., an iPhone®, cellular telephone, an iPad®, computing tablet, a personal digital assistant (PDA)) or wearable devices (e.g., a Google Glass® head mounted display), running software such as Microsoft Windows Mobile®, and/or a variety of mobile operating systems such as iOS, Windows Phone, Android, BlackBerry 8, Palm OS, and the like, and being Internet, e-mail, short message service (SMS), Blackberry®, or other communication protocol enabled. Alternatively, the client computing devices can be general-purpose personal computers including, by way of example, personal computers and/or laptop computers running various versions of Microsoft Windows®, Apple Macintosh®, and/or Linux operating systems. The client computing devices can be workstation computers running any of a variety of commercially-available UNIX® or UNIX-like operating systems, including without limitation the variety of GNU/Linux operating systems, such as for example, Google Chrome OS. Alternatively, or in addition, client computing devices may be any other electronic device, such as a thin-client computer, an Internet-enabled gaming system (e.g., a Microsoft Xbox gaming console with or without a Kinect® gesture input device), and/or a personal messaging device, capable of communicating over a network that can access the VCN 606 and/or the Internet.

The VCN 606 can include a local peering gateway (LPG) 610 that can be communicatively coupled to a secure shell (SSH) VCN 612 via an LPG 610 contained in the SSH VCN 612. The SSH VCN 612 can include an SSH subnet 614, and the SSH VCN 612 can be communicatively coupled to a control plane VCN 616 via the LPG 610 contained in the control plane VCN 616. Also, the SSH VCN 612 can be communicatively coupled to a data plane VCN 618 via an LPG 610. The control plane VCN 616 and the data plane VCN 618 can be contained in a service tenancy 619 that can be owned and/or operated by the IaaS provider.

The control plane VCN 616 can include a control plane demilitarized zone (DMZ) tier 620 that acts as a perimeter network (e.g., portions of a corporate network between the corporate intranet and external networks). The DMZ-based servers may have restricted responsibilities and help keep security breaches contained. Additionally, the DMZ tier 620 can include one or more load balancer (LB) subnet(s) 622, a control plane app tier 624 that can include app subnet(s) 626, a control plane data tier 628 that can include database (DB) subnet(s) 630 (e.g., frontend DB subnet(s) and/or backend DB subnet(s)). The LB subnet(s) 622 contained in the control plane DMZ tier 620 can be communicatively coupled to the app subnet(s) 626 contained in the control plane app tier 624 and an Internet gateway 634 that can be contained in the control plane VCN 616, and the app subnet(s) 626 can be communicatively coupled to the DB subnet(s) 630 contained in the control plane data tier 628 and a service gateway 636 and a network address translation (NAT) gateway 638. The control plane VCN 616 can include the service gateway 636 and the NAT gateway 638.

The control plane VCN 616 can include a data plane mirror app tier 640 that can include app subnet(s) 626. The app subnet(s) 626 contained in the data plane mirror app tier 640 can include a virtual network interface controller (VNIC) 642 that can execute a compute instance 644. The compute instance 644 can communicatively couple the app subnet(s) 626 of the data plane mirror app tier 640 to app subnet(s) 626 that can be contained in a data plane app tier 646.

The data plane VCN 618 can include the data plane app tier 646, a data plane DMZ tier 648, and a data plane data tier 650. The data plane DMZ tier 648 can include LB subnet(s) 622 that can be communicatively coupled to the app subnet(s) 626 of the data plane app tier 646 and the Internet gateway 634 of the data plane VCN 618. The app subnet(s) 626 can be communicatively coupled to the service gateway 636 of the data plane VCN 618 and the NAT gateway 638 of the data plane VCN 618. The data plane data tier 650 can also include the DB subnet(s) 630 that can be communicatively coupled to the app subnet(s) 626 of the data plane app tier 646.

The Internet gateway 634 of the control plane VCN 616 and of the data plane VCN 618 can be communicatively coupled to a metadata management service 652 that can be communicatively coupled to public Internet 654. Public Internet 654 can be communicatively coupled to the NAT gateway 638 of the control plane VCN 616 and of the data plane VCN 618. The service gateway 636 of the control plane VCN 616 and of the data plane VCN 618 can be communicatively couple to cloud services 656.

In some examples, the service gateway 636 of the control plane VCN 616 or of the data plan VCN 618 can make application programming interface (API) calls to cloud services 656 without going through public Internet 654. The API calls to cloud services 656 from the service gateway 636 can be one-way: the service gateway 636 can make API calls to cloud services 656, and cloud services 656 can send requested data to the service gateway 636. But, cloud services 656 may not initiate API calls to the service gateway 636.

In some examples, the secure host tenancy 604 can be directly connected to the service tenancy 619, which may be otherwise isolated. The secure host subnet 608 can communicate with the SSH subnet 614 through an LPG 610 that may enable two-way communication over an otherwise isolated system. Connecting the secure host subnet 608 to the SSH subnet 614 may give the secure host subnet 608 access to other entities within the service tenancy 619.

The control plane VCN 616 may allow users of the service tenancy 619 to set up or otherwise provision desired resources. Desired resources provisioned in the control plane VCN 616 may be deployed or otherwise used in the data plane VCN 618. In some examples, the control plane VCN 616 can be isolated from the data plane VCN 618, and the data plane mirror app tier 640 of the control plane VCN 616 can communicate with the data plane app tier 646 of the data plane VCN 618 via VNICs 642 that can be contained in the data plane mirror app tier 640 and the data plane app tier 646.

In some examples, users of the system, or customers, can make requests, for example create, read, update, or delete (CRUD) operations, through public Internet 654 that can communicate the requests to the metadata management service 652. The metadata management service 652 can communicate the request to the control plane VCN 616 through the Internet gateway 634. The request can be received by the LB subnet(s) 622 contained in the control plane DMZ tier 620. The LB subnet(s) 622 may determine that the request is valid, and in response to this determination, the LB subnet(s) 622 can transmit the request to app subnet(s) 626 contained in the control plane app tier 624. If the request is validated and requires a call to public Internet 654, the call to public Internet 654 may be transmitted to the NAT gateway 638 that can make the call to public Internet 654. Memory that may be desired to be stored by the request can be stored in the DB subnet(s) 630.

In some examples, the data plane mirror app tier 640 can facilitate direct communication between the control plane VCN 616 and the data plane VCN 618. For example, changes, updates, or other suitable modifications to configuration may be desired to be applied to the resources contained in the data plane VCN 618. Via a VNIC 642, the control plane VCN 616 can directly communicate with, and can thereby execute the changes, updates, or other suitable modifications to configuration to, resources contained in the data plane VCN 618.

In some embodiments, the control plane VCN 616 and the data plane VCN 618 can be contained in the service tenancy 619. In this case, the user, or the customer, of the system may not own or operate either the control plane VCN 616 or the data plane VCN 618. Instead, the IaaS provider may own or operate the control plane VCN 616 and the data plane VCN 618, both of which may be contained in the service tenancy 619. This embodiment can enable isolation of networks that may prevent users or customers from interacting with other users', or other customers', resources. Also, this embodiment may allow users or customers of the system to store databases privately without needing to rely on public Internet 654, which may not have a desired level of security, for storage.

In other embodiments, the LB subnet(s) 622 contained in the control plane VCN 616 can be configured to receive a signal from the service gateway 636. In this embodiment, the control plane VCN 616 and the data plane VCN 618 may be configured to be called by a customer of the IaaS provider without calling public Internet 654. Customers of the IaaS provider may desire this embodiment since database(s) that the customers use may be controlled by the IaaS provider and may be stored on the service tenancy 619, which may be isolated from public Internet 654.

Figure 7:
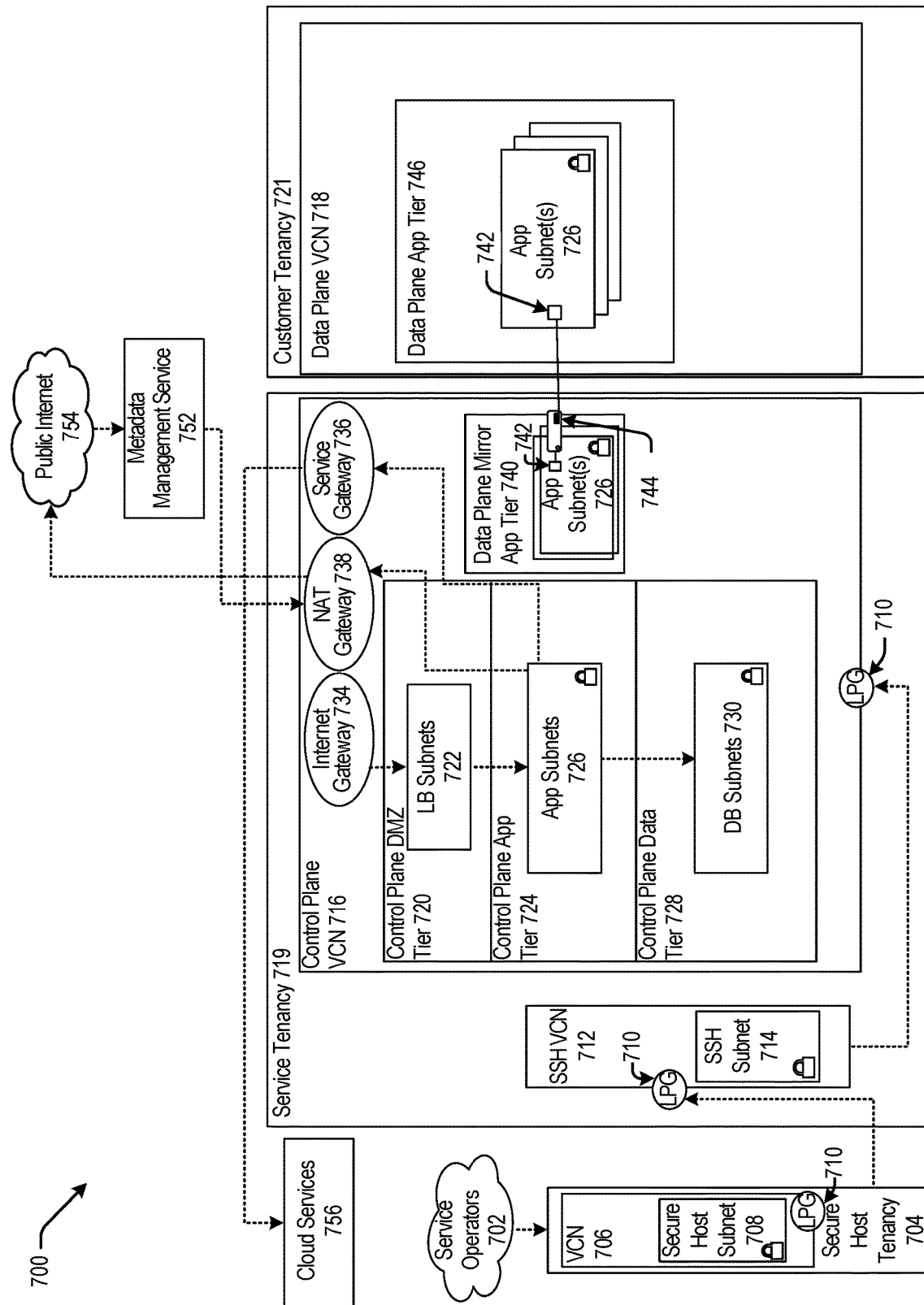
FIG. 7 is a block diagram illustrating another pattern for implementing a cloud infrastructure as a service system, according to at least one embodiment.

FIG. 7 is a block diagram 700 illustrating another example pattern of an IaaS architecture, according to at least one embodiment. Service operators 702 (e.g. service operators 602 of FIG. 6) can be communicatively coupled to a secure host tenancy 704 (e.g. the secure host tenancy 604 of FIG. 6) that can include a virtual cloud network (VCN) 706 (e.g. the VCN 606 of FIG. 6) and a secure host subnet 708 (e.g. the secure host subnet 608 of FIG. 6). The VCN 706 can include a local peering gateway (LPG) 710 (e.g. the LPG 610 of FIG. 6) that can be communicatively coupled to a secure shell (SSH) VCN 712 (e.g. the SSH VCN 612 of FIG. 6) via an LPG 610 contained in the SSH VCN 712. The SSH VCN 712 can include an SSH subnet 714 (e.g. the SSH subnet 614 of FIG. 6), and the SSH VCN 712 can be communicatively coupled to a control plane VCN 716 (e.g. the control plane VCN 616 of FIG. 6) via an LPG 710 contained in the control plane VCN 716. The control plane VCN 716 can be contained in a service tenancy 719 (e.g. the service tenancy 619 of FIG. 6), and the data plane VCN 718 (e.g. the data plane VCN 618 of FIG. 6) can be contained in a customer tenancy 721 that may be owned or operated by users, or customers, of the system.

The control plane VCN 716 can include a control plane DMZ tier 720 (e.g. the control plane DMZ tier 620 of FIG. 6) that can include LB subnet(s) 722 (e.g. LB subnet(s) 622 of FIG. 6), a control plane app tier 724 (e.g. the control plane app tier 624 of FIG. 6) that can include app subnet(s) 726 (e.g. app subnet(s) 626 of FIG. 6), a control plane data tier 728 (e.g. the control plane data tier 628 of FIG. 6) that can include database (DB) subnet(s) 730 (e.g. similar to DB subnet(s) 630 of FIG. 6). The LB subnet(s) 722 contained in the control plane DMZ tier 720 can be communicatively coupled to the app subnet(s) 726 contained in the control plane app tier 724 and an Internet gateway 734 (e.g. the Internet gateway 634 of FIG. 6) that can be contained in the control plane VCN 716, and the app subnet(s) 726 can be communicatively coupled to the DB subnet(s) 730 contained in the control plane data tier 728 and a service gateway 736 (e.g. the service gateway of FIG. 6) and a network address translation (NAT) gateway 738 (e.g. the NAT gateway 638 of FIG. 6). The control plane VCN 716 can include the service gateway 736 and the NAT gateway 738.

The control plane VCN 716 can include a data plane mirror app tier 740 (e.g. the data plane mirror app tier 640 of FIG. 6) that can include app subnet(s) 726. The app subnet(s) 726 contained in the data plane mirror app tier 740 can include a virtual network interface controller (VNIC) 742 (e.g. the VNIC of 642) that can execute a compute instance 744 (e.g. similar to the compute instance 644 of FIG. 6). The compute instance 744 can facilitate communication between the app subnet(s) 726 of the data plane mirror app tier 740 and the app subnet(s) 726 that can be contained in a data plane app tier 746 (e.g. the data plane app tier 646 of FIG. 6) via the VNIC 742 contained in the data plane mirror app tier 740 and the VNIC 742 contained in the data plan app tier 746.

The Internet gateway 734 contained in the control plane VCN 716 can be communicatively coupled to a metadata management service 752 (e.g. the metadata management service 652 of FIG. 6) that can be communicatively coupled to public Internet 754 (e.g. public Internet 654 of FIG. 6). Public Internet 754 can be communicatively coupled to the NAT gateway 738 contained in the control plane VCN 716. The service gateway 736 contained in the control plane VCN 716 can be communicatively couple to cloud services 756 (e.g. cloud services 656 of FIG. 6).

In some examples, the data plane VCN 718 can be contained in the customer tenancy 721. In this case, the IaaS provider may provide the control plane VCN 716 for each customer, and the IaaS provider may, for each customer, set up a unique compute instance 744 that is contained in the service tenancy 719. Each compute instance 744 may allow communication between the control plane VCN 716, contained in the service tenancy 719, and the data plane VCN 718 that is contained in the customer tenancy 721. The compute instance 744 may allow resources, which are provisioned in the control plane VCN 716 that is contained in the service tenancy 719, to be deployed or otherwise used in the data plane VCN 718 that is contained in the customer tenancy 721.

In other examples, the customer of the IaaS provider may have databases that live in the customer tenancy 721. In this example, the control plane VCN 716 can include the data plane mirror app tier 740 that can include app subnet(s) 726. The data plane mirror app tier 740 can reside in the data plane VCN 718, but the data plane mirror app tier 740 may not live in the data plane VCN 718. That is, the data plane mirror app tier 740 may have access to the customer tenancy 721, but the data plane mirror app tier 740 may not exist in the data plane VCN 718 or be owned or operated by the customer of the IaaS provider. The data plane mirror app tier 740 may be configured to make calls to the data plane VCN 718 but may not be configured to make calls to any entity contained in the control plane VCN 716. The customer may desire to deploy or otherwise use resources in the data plane VCN 718 that are provisioned in the control plane VCN 716, and the data plane mirror app tier 740 can facilitate the desired deployment, or other usage of resources, of the customer.

In some embodiments, the customer of the IaaS provider can apply filters to the data plane VCN 718. In this embodiment, the customer can determine what the data plane VCN 718 can access, and the customer may restrict access to public Internet 754 from the data plane VCN 718. The IaaS provider may not be able to apply filters or otherwise control access of the data plane VCN 718 to any outside networks or databases. Applying filters and controls by the customer onto the data plane VCN 718, contained in the customer tenancy 721, can help isolate the data plane VCN 718 from other customers and from public Internet 754.

In some embodiments, cloud services 756 can be called by the service gateway 736 to access services that may not exist on public Internet 754, on the control plane VCN 716, or on the data plane VCN 718. The connection between cloud services 756 and the control plane VCN 716 or the data plane VCN 718 may not be live or continuous. Cloud services 756 may exist on a different network owned or operated by the IaaS provider. Cloud services 756 may be configured to receive calls from the service gateway 736 and may be configured to not receive calls from public Internet 754. Some cloud services 756 may be isolated from other cloud services 756, and the control plane VCN 716 may be isolated from cloud services 756 that may not be in the same region as the control plane VCN 716. For example, the control plane VCN 716 may be located in "Region 1," and cloud service "Deployment 6," may be located in Region 1 and in "Region 2." If a call to Deployment 6 is made by the service gateway 736 contained in the control plane VCN 716 located in Region 1, the call may be transmitted to Deployment 6 in Region 1. In this example, the control plane VCN 716, or Deployment 6 in Region 1, may not be communicatively coupled to, or otherwise in communication with, Deployment 6 in Region 2.

Figure 8:
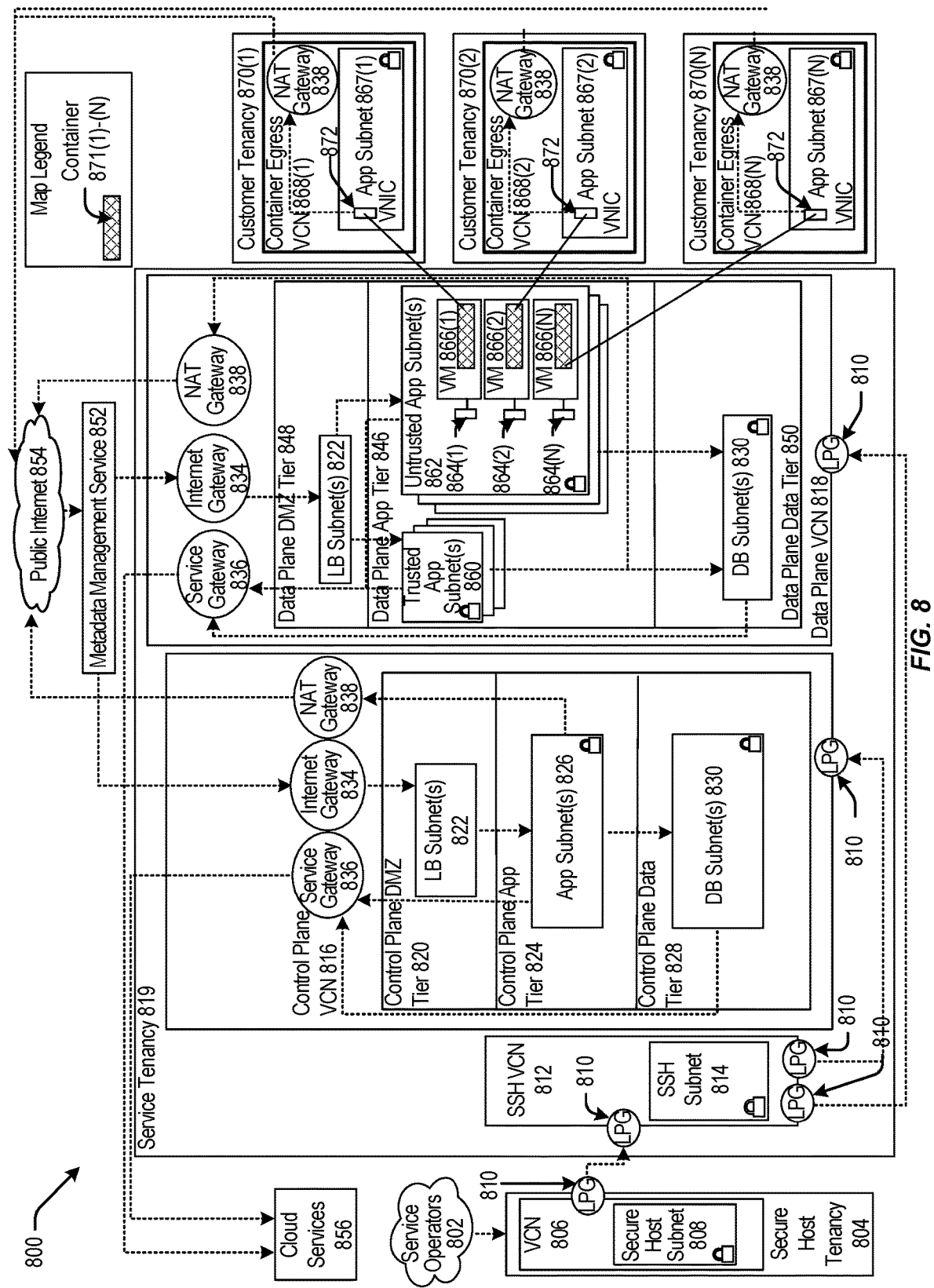
FIG. 8 is a block diagram illustrating another pattern for implementing a cloud infrastructure as a service system, according to at least one embodiment.

FIG. 8 is a block diagram 800 illustrating another example pattern of an IaaS architecture, according to at least one embodiment. Service operators 802 (e.g. service operators 602 of FIG. 6) can be communicatively coupled to a secure host tenancy 804 (e.g. the secure host tenancy 604 of FIG. 6) that can include a virtual cloud network (VCN) 806 (e.g. the VCN 606 of FIG. 6) and a secure host subnet 808 (e.g. the secure host subnet 608 of FIG. 6). The VCN 806 can include an LPG 810 (e.g. the LPG 610 of FIG. 6) that can be communicatively coupled to an SSH VCN 812 (e.g. the SSH VCN 612 of FIG. 6) via an LPG 810 contained in the SSH VCN 812. The SSH VCN 812 can include an SSH subnet 814 (e.g. the SSH subnet 614 of FIG. 6), and the SSH VCN 812 can be communicatively coupled to a control plane VCN 816 (e.g. the control plane VCN 616 of FIG. 6) via an LPG 810 contained in the control plane VCN 816 and to a data plane VCN 818 (e.g. the data plane 618 of FIG. 6) via an LPG 810 contained in the data plane VCN 818. The control plane VCN 816 and the data plane VCN 818 can be contained in a service tenancy 819 (e.g. the service tenancy 619 of FIG. 6).

The control plane VCN 816 can include a control plane DMZ tier 820 (e.g. the control plane DMZ tier 620 of FIG. 6) that can include load balancer (LB) subnet(s) 822 (e.g. LB subnet(s) 622 of FIG. 6), a control plane app tier 824 (e.g. the control plane app tier 624 of FIG. 6) that can include app subnet(s) 826 (e.g. similar to app subnet(s) 626 of FIG. 6), a control plane data tier 828 (e.g. the control plane data tier 628 of FIG. 6) that can include DB subnet(s) 830. The LB subnet(s) 822 contained in the control plane DMZ tier 820 can be communicatively coupled to the app subnet(s) 826 contained in the control plane app tier 824 and to an Internet gateway 834 (e.g. the Internet gateway 634 of FIG. 6) that can be contained in the control plane VCN 816, and the app subnet(s) 826 can be communicatively coupled to the DB subnet(s) 830 contained in the control plane data tier 828 and to a service gateway 836 (e.g. the service gateway of FIG. 6) and a network address translation (NAT) gateway 838 (e.g. the NAT gateway 638 of FIG. 6). The control plane VCN 816 can include the service gateway 836 and the NAT gateway 838.

The data plane VCN 818 can include a data plane app tier 846 (e.g. the data plane app tier 646 of FIG. 6), a data plane DMZ tier 848 (e.g. the data plane DMZ tier 648 of FIG. 6), and a data plane data tier 850 (e.g. the data plane data tier 650 of FIG. 6). The data plane DMZ tier 848 can include LB subnet(s) 822 that can be communicatively coupled to trusted app subnet(s) 860 and untrusted app subnet(s) 862 of the data plane app tier 846 and the Internet gateway 834 contained in the data plane VCN 818. The trusted app subnet(s) 860 can be communicatively coupled to the service gateway 836 contained in the data plane VCN 818, the NAT gateway 838 contained in the data plane VCN 818, and DB subnet(s) 830 contained in the data plane data tier 850. The untrusted app subnet(s) 862 can be communicatively coupled to the service gateway 836 contained in the data plane VCN 818 and DB subnet(s) 830 contained in the data plane data tier 850. The data plane data tier 850 can include DB subnet(s) 830 that can be communicatively coupled to the service gateway 836 contained in the data plane VCN 818.

The untrusted app subnet(s) 862 can include one or more primary VNICs 864(1)-(N) that can be communicatively coupled to tenant virtual machines (VMs) 866(1)-(N). Each tenant VM 866(1)-(N) can be communicatively coupled to a respective app subnet 867(1)-(N) that can be contained in respective container egress VCNs 868(1)-(N) that can be contained in respective customer tenancies 870(1)-(N). Respective secondary VNICs 872(1)-(N) can facilitate communication between the untrusted app subnet(s) 862 contained in the data plane VCN 818 and the app subnet contained in the container egress VCNs 868(1)-(N). Each container egress VCNs 868(1)-(N) can include a NAT gateway 838 that can be communicatively coupled to public Internet 854 (e.g. public Internet 654 of FIG. 6).

The Internet gateway 834 contained in the control plane VCN 816 and contained in the data plane VCN 818 can be communicatively coupled to a metadata management service 852 (e.g. the metadata management system 652 of FIG. 6) that can be communicatively coupled to public Internet 854. Public Internet 854 can be communicatively coupled to the NAT gateway 838 contained in the control plane VCN 816 and contained in the data plane VCN 818. The service gateway 836 contained in the control plane VCN 816 and contained in the data plane VCN 818 can be communicatively couple to cloud services 856.

In some embodiments, the data plane VCN 818 can be integrated with customer tenancies 870. This integration can be useful or desirable for customers of the IaaS provider in some cases such as a case that may desire support when executing code. The customer may provide code to run that may be destructive, may communicate with other customer resources, or may otherwise cause undesirable effects. In response to this, the IaaS provider may determine whether to run code given to the IaaS provider by the customer.

In some examples, the customer of the IaaS provider may grant temporary network access to the IaaS provider and request a function to be attached to the data plane tier app 846. Code to run the function may be executed in the VMs 866(1)-(N), and the code may not be configured to run anywhere else on the data plane VCN 818. Each VM 866(1)-(N) may be connected to one customer tenancy 870. Respective containers 871(1)-(N) contained in the VMs 866(1)-(N) may be configured to run the code. In this case, there can be a dual isolation (e.g., the containers 871(1)-(N) running code, where the containers 871(1)-(N) may be contained in at least the VM 866(1)-(N) that are contained in the untrusted app subnet(s) 862), which may help prevent incorrect or otherwise undesirable code from damaging the network of the IaaS provider or from damaging a network of a different customer. The containers 871(1)-(N) may be communicatively coupled to the customer tenancy 870 and may be configured to transmit or receive data from the customer tenancy 870. The containers 871(1)-(N) may not be configured to transmit or receive data from any other entity in the data plane VCN 818. Upon completion of running the code, the IaaS provider may kill or otherwise dispose of the containers 871(1)-(N).

In some embodiments, the trusted app subnet(s) 860 may run code that may be owned or operated by the IaaS provider. In this embodiment, the trusted app subnet(s) 860 may be communicatively coupled to the DB subnet(s) 830 and be configured to execute CRUD operations in the DB subnet(s) 830. The untrusted app subnet(s) 862 may be communicatively coupled to the DB subnet(s) 830, but in this embodiment, the untrusted app subnet(s) may be configured to execute read operations in the DB subnet(s) 830. The containers 871(1)-(N) that can be contained in the VM 866(1)-(N) of each customer and that may run code from the customer may not be communicatively coupled with the DB subnet(s) 830.

In other embodiments, the control plane VCN 816 and the data plane VCN 818 may not be directly communicatively coupled. In this embodiment, there may be no direct communication between the control plane VCN 816 and the data plane VCN 818. However, communication can occur indirectly through at least one method. An LPG 810 may be established by the IaaS provider that can facilitate communication between the control plane VCN 816 and the data plane VCN 818. In another example, the control plane VCN 816 or the data plane VCN 818 can make a call to cloud services 856 via the service gateway 836. For example, a call to cloud services 856 from the control plane VCN 816 can include a request for a service that can communicate with the data plane VCN 818.

Figure 9:
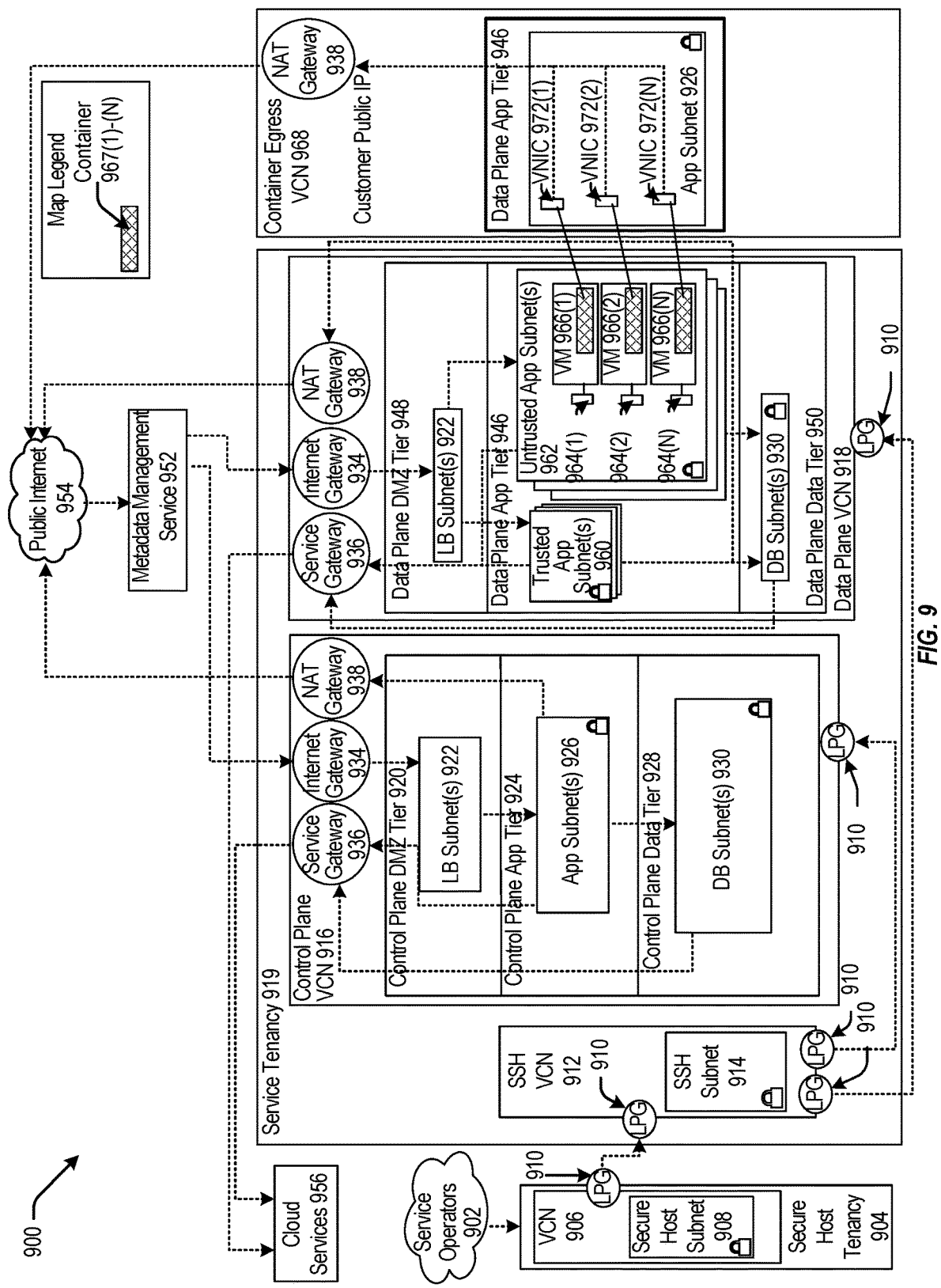
FIG. 9 is a block diagram illustrating another pattern for implementing a cloud infrastructure as a service system, according to at least one embodiment.

FIG. 9 is a block diagram 900 illustrating another example pattern of an IaaS architecture, according to at least one embodiment. Service operators 902 (e.g. service operators 602 of FIG. 6) can be communicatively coupled to a secure host tenancy 904 (e.g. the secure host tenancy 604 of FIG. 6) that can include a virtual cloud network (VCN) 906 (e.g. the VCN 606 of FIG. 6) and a secure host subnet 908 (e.g. the secure host subnet 608 of FIG. 6). The VCN 906 can include an LPG 910 (e.g. the LPG 610 of FIG. 6) that can be communicatively coupled to an SSH VCN 912 (e.g. the SSH VCN 612 of FIG. 6) via an LPG 910 contained in the SSH VCN 912. The SSH VCN 912 can include an SSH subnet 914 (e.g. the SSH subnet 614 of FIG. 6), and the SSH VCN 912 can be communicatively coupled to a control plane VCN 916 (e.g. the control plane VCN 616 of FIG. 6) via an LPG 910 contained in the control plane VCN 916 and to a data plane VCN 918 (e.g. the data plane 618 of FIG. 6) via an LPG 910 contained in the data plane VCN 918. The control plane VCN 916 and the data plane VCN 918 can be contained in a service tenancy 919 (e.g. the service tenancy 619 of FIG. 6).

The control plane VCN 916 can include a control plane DMZ tier 920 (e.g. the control plane DMZ tier 620 of FIG. 6) that can include LB subnet(s) 922 (e.g. LB subnet(s) 622 of FIG. 6), a control plane app tier 924 (e.g. the control plane app tier 624 of FIG. 6) that can include app subnet(s) 926 (e.g. app subnet(s) 626 of FIG. 6), a control plane data tier 928 (e.g. the control plane data tier 628 of FIG. 6) that can include DB subnet(s) 930 (e.g. DB subnet(s) 830 of FIG. 8). The LB subnet(s) 922 contained in the control plane DMZ tier 920 can be communicatively coupled to the app subnet(s) 926 contained in the control plane app tier 924 and to an Internet gateway 934 (e.g. the Internet gateway 634 of FIG. 6) that can be contained in the control plane VCN 916, and the app subnet(s) 926 can be communicatively coupled to the DB subnet(s) 930 contained in the control plane data tier 928 and to a service gateway 936 (e.g. the service gateway of FIG. 6) and a network address translation (NAT) gateway 938 (e.g. the NAT gateway 638 of FIG. 6). The control plane VCN 916 can include the service gateway 936 and the NAT gateway 938.

The data plane VCN 918 can include a data plane app tier 946 (e.g. the data plane app tier 646 of FIG. 6), a data plane DMZ tier 948 (e.g. the data plane DMZ tier 648 of FIG. 6), and a data plane data tier 950 (e.g. the data plane data tier 650 of FIG. 6). The data plane DMZ tier 948 can include LB subnet(s) 922 that can be communicatively coupled to trusted app subnet(s) 960 (e.g. trusted app subnet(s) 860 of FIG. 8) and untrusted app subnet(s) 962 (e.g. untrusted app subnet(s) 862 of FIG. 8) of the data plane app tier 946 and the Internet gateway 934 contained in the data plane VCN 918. The trusted app subnet(s) 960 can be communicatively coupled to the service gateway 936 contained in the data plane VCN 918, the NAT gateway 938 contained in the data plane VCN 918, and DB subnet(s) 930 contained in the data plane data tier 950. The untrusted app subnet(s) 962 can be communicatively coupled to the service gateway 936 contained in the data plane VCN 918 and DB subnet(s) 930 contained in the data plane data tier 950. The data plane data tier 950 can include DB subnet(s) 930 that can be communicatively coupled to the service gateway 936 contained in the data plane VCN 918.

The untrusted app subnet(s) 962 can include primary VNICs 964(1)-(N) that can be communicatively coupled to tenant virtual machines (VMs) 966(1)-(N) residing within the untrusted app subnet(s) 962. Each tenant VM 966(1)-(N) can run code in a respective container 967(1)-(N), and be communicatively coupled to an app subnet 926 that can be contained in a data plane app tier 946 that can be contained in a container egress VCN 968. Respective secondary VNICs 972(1)-(N) can facilitate communication between the untrusted app subnet(s) 962 contained in the data plane VCN 918 and the app subnet contained in the container egress VCN 968. The container egress VCN can include a NAT gateway 938 that can be communicatively coupled to public Internet 954 (e.g. public Internet 654 of FIG. 6).

The Internet gateway 934 contained in the control plane VCN 916 and contained in the data plane VCN 918 can be communicatively coupled to a metadata management service 952 (e.g. the metadata management system 652 of FIG. 6) that can be communicatively coupled to public Internet 954. Public Internet 954 can be communicatively coupled to the NAT gateway 938 contained in the control plane VCN 916 and contained in the data plane VCN 918. The service gateway 936 contained in the control plane VCN 916 and contained in the data plane VCN 918 can be communicatively couple to cloud services 956.

In some examples, the pattern illustrated by the architecture of block diagram 900 of FIG. 9 may be considered an exception to the pattern illustrated by the architecture of block diagram 800 of FIG. 8 and may be desirable for a customer of the IaaS provider if the IaaS provider cannot directly communicate with the customer (e.g., a disconnected region). The respective containers 967(1)-(N) that are contained in the VMs 966(1)-(N) for each customer can be accessed in real-time by the customer. The containers 967(1)-(N) may be configured to make calls to respective secondary VNICs 972(1)-(N) contained in app subnet(s) 926 of the data plane app tier 946 that can be contained in the container egress VCN 968. The secondary VNICs 972(1)-(N) can transmit the calls to the NAT gateway 938 that may transmit the calls to public Internet 954. In this example, the containers 967(1)-(N) that can be accessed in real-time by the customer can be isolated from the control plane VCN 916 and can be isolated from other entities contained in the data plane VCN 918. The containers 967(1)-(N) may also be isolated from resources from other customers.

In other examples, the customer can use the containers 967(1)-(N) to call cloud services 956. In this example, the customer may run code in the containers 967(1)-(N) that requests a service from cloud services 956. The containers 967(1)-(N) can transmit this request to the secondary VNICs 972(1)-(N) that can transmit the request to the NAT gateway that can transmit the request to public Internet 954. Public Internet 954 can transmit the request to LB subnet(s) 922 contained in the control plane VCN 916 via the Internet gateway 934. In response to determining the request is valid, the LB subnet(s) can transmit the request to app subnet(s) 926 that can transmit the request to cloud services 956 via the service gateway 936.

It should be appreciated that IaaS architectures 600, 700, 800, 900 depicted in the figures may have other components than those depicted. Further, the embodiments shown in the figures are only some examples of a cloud infrastructure system that may incorporate an embodiment of the disclosure. In some other embodiments, the IaaS systems may have more or fewer components than shown in the figures, may combine two or more components, or may have a different configuration or arrangement of components.

In certain embodiments, the IaaS systems described herein may include a suite of applications, middleware, and database service offerings that are delivered to a customer in a self-service, subscription-based, elastically scalable, reliable, highly available, and secure manner. An example of such an IaaS system is the Oracle Cloud Infrastructure (OCI) provided by the present assignee.

Figure 10:
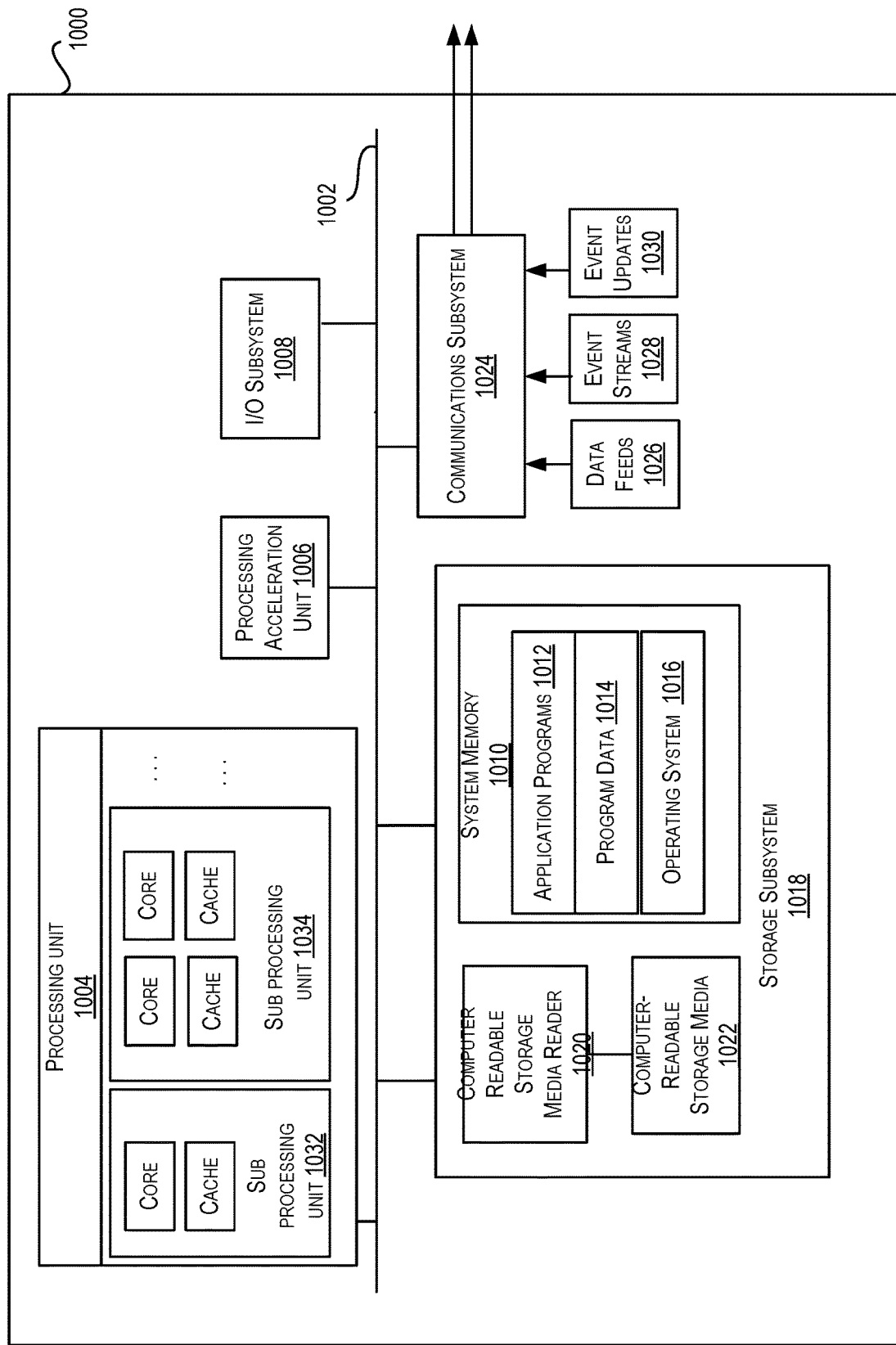
FIG. 10 is a block diagram illustrating an example computer system, according to at least one embodiment.

FIG. 10 illustrates an example computer system 1000, in which various examples of the present disclosure may be implemented. The system 1000 may be used to implement any of the computer systems described above. As shown in the figure, computer system 1000 includes a processing unit 1004 that communicates with a number of peripheral subsystems via a bus subsystem 1002. These peripheral subsystems may include a processing acceleration unit 1006, an I/O subsystem 1008, a storage subsystem 1018 and a communications subsystem 1024. Storage subsystem 1018 includes tangible computer-readable storage media 1022 and a system memory 1010.

Bus subsystem 1002 provides a mechanism for letting the various components and subsystems of computer system 1000 communicate with each other as intended. Although bus subsystem 1002 is shown schematically as a single bus, alternative embodiments of the bus subsystem may utilize multiple buses. Bus subsystem 1002 may be any of several types of bus structures including a memory bus or memory controller, a peripheral bus, and a local bus using any of a variety of bus architectures. For example, such architectures may include an Industry Standard Architecture (ISA) bus, Micro Channel Architecture (MCA) bus, Enhanced ISA (EISA) bus, Video Electronics Standards Association (VESA) local bus, and Peripheral Component Interconnect (PCI) bus, which can be implemented as a Mezzanine bus manufactured to the IEEE P1386.1 standard.

Processing unit 1004, which can be implemented as one or more integrated circuits (e.g., a conventional microprocessor or microcontroller), controls the operation of computer system 1000. One or more processors may be included in processing unit 1004. These processors may include single core or multicore processors. In certain embodiments, processing unit 1004 may be implemented as one or more independent processing units 1032 and/or 1034 with single or multicore processors included in each processing unit. In other embodiments, processing unit 1004 may also be implemented as a quad-core processing unit formed by integrating two dual-core processors into a single chip.

In various examples, processing unit 1004 can execute a variety of programs in response to program code and can maintain multiple concurrently executing programs or processes. At any given time, some or all of the program code to be executed can be resident in processor(s) 1004 and/or in storage subsystem 1018. Through suitable programming, processor(s) 1004 can provide various functionalities described above. Computer system 1000 may additionally include a processing acceleration unit 1006, which can include a digital signal processor (DSP), a special-purpose processor, and/or the like.

I/O subsystem 1008 may include user interface input devices and user interface output devices. User interface input devices may include a keyboard, pointing devices such as a mouse or trackball, a touchpad or touch screen incorporated into a display, a scroll wheel, a click wheel, a dial, a button, a switch, a keypad, audio input devices with voice command recognition systems, microphones, and other types of input devices. User interface input devices may include, for example, motion sensing and/or gesture recognition devices such as the Microsoft Kinect® motion sensor that enables users to control and interact with an input device, such as the Microsoft Xbox® 360 game controller, through a natural user interface using gestures and spoken commands. User interface input devices may also include eye gesture recognition devices such as the Google Glass® blink detector that detects eye activity (e.g., 'blinking' while taking pictures and/or making a menu selection) from users and transforms the eye gestures as input into an input device (e.g., Google Glass®). Additionally, user interface input devices may include voice recognition sensing devices that enable users to interact with voice recognition systems (e.g., Siri® navigator), through voice commands.

User interface input devices may also include, without limitation, three dimensional (3D) mice, joysticks or pointing sticks, gamepads and graphic tablets, and audio/visual devices such as speakers, digital cameras, digital camcorders, portable media players, webcams, image scanners, fingerprint scanners, barcode reader 3D scanners, 3D printers, laser rangefinders, and eye gaze tracking devices. Additionally, user interface input devices may include, for example, medical imaging input devices such as computed tomography, magnetic resonance imaging, position emission tomography, medical ultrasonography devices. User interface input devices may also include, for example, audio input devices such as MIDI keyboards, digital musical instruments and the like.

User interface output devices may include a display subsystem, indicator lights, or non-visual displays such as audio output devices, etc. The display subsystem may be a cathode ray tube (CRT), a flat-panel device, such as that using a liquid crystal display (LCD) or plasma display, a projection device, a touch screen, and the like. In general, use of the term "output device" is intended to include all possible types of devices and mechanisms for outputting information from computer system 1000 to a user or other computer. For example, user interface output devices may include, without limitation, a variety of display devices that visually convey text, graphics and audio/video information such as monitors, printers, speakers, headphones, automotive navigation systems, plotters, voice output devices, and modems.

Computer system 1000 may comprise a storage subsystem 1018 that comprises software elements, shown as being currently located within a system memory 1010. System memory 1010 may store program instructions that are loadable and executable on processing unit 1004, as well as data generated during the execution of these programs.

Depending on the configuration and type of computer system 1000, system memory 1010 may be volatile (such as random access memory (RAM)) and/or non-volatile (such as read-only memory (ROM), flash memory, etc.) The RAM typically contains data and/or program modules that are immediately accessible to and/or presently being operated and executed by processing unit 1004. In some implementations, system memory 1010 may include multiple different types of memory, such as static random access memory (SRAM) or dynamic random access memory (DRAM). In some implementations, a basic input/output system (BIOS), containing the basic routines that help to transfer information between elements within computer system 1000, such as during start-up, may typically be stored in the ROM. By way of example, and not limitation, system memory 1010 also illustrates application programs 1012, which may include client applications, Web browsers, mid-tier applications, relational database management systems (RDBMS), etc., program data 1014, and an operating system 1016. By way of example, operating system 1016 may include various versions of Microsoft Windows®, Apple Macintosh®, and/or Linux operating systems, a variety of commercially-available UNIX® or UNIX-like operating systems (including without limitation the variety of GNU/Linux operating systems, the Google Chrome® OS, and the like) and/or mobile operating systems such as iOS, Windows® Phone, Android® OS, BlackBerry® 10 OS, and Palm® OS operating systems.

Storage subsystem 1018 may also provide a tangible computer-readable storage medium for storing the basic programming and data constructs that provide the functionality of some embodiments. Software (programs, code modules, instructions) that when executed by a processor provide the functionality described above may be stored in storage subsystem 1018. These software modules or instructions may be executed by processing unit 1004. Storage subsystem 1018 may also provide a repository for storing data used in accordance with the present disclosure.

Storage subsystem 1000 may also include a computer-readable storage media reader 1020 that can further be connected to computer-readable storage media 1022. Together and, optionally, in combination with system memory 1010, computer-readable storage media 1022 may comprehensively represent remote, local, fixed, and/or removable storage devices plus storage media for temporarily and/or more permanently containing, storing, transmitting, and retrieving computer-readable information.

Computer-readable storage media 1022 containing code, or portions of code, can also include any appropriate media known or used in the art, including storage media and communication media, such as but not limited to, volatile and non-volatile, removable and non-removable media implemented in any method or technology for storage and/or transmission of information. This can include tangible computer-readable storage media such as RAM, ROM, electronically erasable programmable ROM (EEPROM), flash memory or other memory technology, CD-ROM, digital versatile disk (DVD), or other optical storage, magnetic cassettes, magnetic tape, magnetic disk storage or other magnetic storage devices, or other tangible computer readable media. This can also include nontangible computer-readable media, such as data signals, data transmissions, or any other medium which can be used to transmit the desired information and which can be accessed by computing system 1000.

By way of example, computer-readable storage media 1022 may include a hard disk drive that reads from or writes to non-removable, nonvolatile magnetic media, a magnetic disk drive that reads from or writes to a removable, non-volatile magnetic disk, and an optical disk drive that reads from or writes to a removable, nonvolatile optical disk such as a CD ROM, DVD, and Blu-Ray® disk, or other optical media. Computer-readable storage media 1022 may include, but is not limited to, Zip® drives, flash memory cards, universal serial bus (USB) flash drives, secure digital (SD) cards, DVD disks, digital video tape, and the like. Computer-readable storage media 1022 may also include, solid-state drives (SSD) based on non-volatile memory such as flash-memory based SSDs, enterprise flash drives, solid state ROM, and the like, SSDs based on volatile memory such as solid state RAM, dynamic RAM, static RAM, DRAM-based SSDs, magnetoresistive RAM (MRAM) SSDs, and hybrid SSDs that use a combination of DRAM and flash memory based SSDs. The disk drives and their associated computer-readable media may provide non-volatile storage of computer-readable instructions, data structures, program modules, and other data for computer system 1000.

Communications subsystem 1024 provides an interface to other computer systems and networks. Communications subsystem 1024 serves as an interface for receiving data from and transmitting data to other systems from computer system 1000. For example, communications subsystem 1024 may enable computer system 1000 to connect to one or more devices via the Internet. In some embodiments communications subsystem 1024 can include radio frequency (RF) transceiver components for accessing wireless voice and/or data networks (e.g., using cellular telephone technology, advanced data network technology, such as 3G, 4G or EDGE (enhanced data rates for global evolution), Wi-Fi (IEEE 802.11 family standards, or other mobile communication technologies, or any combination thereof), global positioning system (GPS) receiver components, and/or other components. In some embodiments communications subsystem 1024 can provide wired network connectivity (e.g., Ethernet) in addition to or instead of a wireless interface.

In some embodiments, communications subsystem 1024 may also receive input communication in the form of structured and/or unstructured data feeds 1026, event streams 1028, event updates 1030, and the like on behalf of one or more users who may use computer system 1000.

By way of example, communications subsystem 1024 may be configured to receive data feeds 1026 in real-time from users of social networks and/or other communication services such as Twitter® feeds, Facebook® updates, web feeds such as Rich Site Summary (RSS) feeds, and/or real-time updates from one or more third party information sources.

Additionally, communications subsystem 1024 may also be configured to receive data in the form of continuous data streams, which may include event streams 1028 of real-time events and/or event updates 1030, that may be continuous or unbounded in nature with no explicit end. Examples of applications that generate continuous data may include, for example, sensor data applications, financial tickers, network performance measuring tools (e.g. network monitoring and traffic management applications), clickstream analysis tools, automobile traffic monitoring, and the like.

Communications subsystem 1024 may also be configured to output the structured and/or unstructured data feeds 1026, event streams 1028, event updates 1030, and the like to one or more databases that may be in communication with one or more streaming data source computers coupled to computer system 1000.

Computer system 1000 can be one of various types, including a handheld portable device (e.g., an iPhone® cellular phone, an iPad® computing tablet, a PDA), a wearable device (e.g., a Google Glass® head mounted display), a PC, a workstation, a mainframe, a kiosk, a server rack, or any other data processing system.

Due to the ever-changing nature of computers and networks, the description of computer system 1000 depicted in the figure is intended only as a specific example. Many other configurations having more or fewer components than the system depicted in the figure are possible. For example, customized hardware might also be used and/or particular elements might be implemented in hardware, firmware, software (including applets), or a combination. Further, connection to other computing devices, such as network input/output devices, may be employed. Based on the disclosure and teachings provided herein, a person of ordinary skill in the art will appreciate other ways and/or methods to implement the various examples.

Any of the software components or functions described in this application, may be implemented as software code to be executed by a processor using any suitable computer language such as, for example, Java, C++ or Perl using, for example, conventional or object-oriented techniques. The software code may be stored as a series of instructions, or commands on a computer readable medium for storage and/or transmission, suitable media include random access memory (RAM), a read only memory (ROM), a magnetic medium such as a hard-drive or a floppy disk, or an optical medium such as a compact disk (CD) or DVD (digital versatile disk), flash memory, and the like. The computer readable medium may be any combination of such storage or transmission devices.

Such programs may also be encoded and transmitted using carrier signals adapted for transmission via wired, optical, and/or wireless networks conforming to a variety of protocols, including the Internet. As such, a computer readable medium according to an embodiment of the present disclosure may be created using a data signal encoded with such programs. Computer readable media encoded with the program code may be packaged with a compatible device or provided separately from other devices (e.g., via Internet download). Any such computer readable medium may reside on or within a single computer program product (e.g. a hard drive or an entire computer system), and may be present on or within different computer program products within a system or network. A computer system may include a monitor, printer, or other suitable display for providing any of the results mentioned herein to a user.

Although specific embodiments of the disclosure have been described, various modifications, alterations, alternative constructions, and equivalents are also encompassed within the scope of the disclosure. Embodiments of the present disclosure are not restricted to operation within certain specific data processing environments, but are free to operate within a plurality of data processing environments. Additionally, although embodiments of the present disclosure have been described using a particular series of transactions and steps, it should be apparent to those skilled in the art that the scope of the present disclosure is not limited to the described series of transactions and steps. Various features and aspects of the above-described embodiments may be used individually or jointly.

Further, while embodiments of the present disclosure have been described using a particular combination of hardware and software, it should be recognized that other combinations of hardware and software are also within the scope of the present disclosure. Embodiments of the present disclosure may be implemented only in hardware, or only in software, or using combinations thereof. The various processes described herein can be implemented on the same processor or different processors in any combination. Accordingly, where components or modules are described as being configured to perform certain operations, such configuration can be accomplished, e.g., by designing electronic circuits to perform the operation, by programming programmable electronic circuits (such as microprocessors) to perform the operation, or any combination thereof. Processes can communicate using a variety of techniques including but not limited to conventional techniques for inter process communication, and different pairs of processes may use different techniques, or the same pair of processes may use different techniques at different times.

The specification and drawings are, accordingly, to be regarded in an illustrative rather than a restrictive sense. It will, however, be evident that additions, subtractions, deletions, and other modifications and changes may be made thereunto without departing from the broader spirit and scope as set forth in the claims. Thus, although specific disclosure embodiments have been described, these are not intended to be limiting. Various modifications and equivalents are within the scope of the following claims.

The use of the terms "a" and "an" and "the" and similar referents in the context of describing the disclosed embodiments (especially in the context of the following claims) are to be construed to cover both the singular and the plural, unless otherwise indicated herein or clearly contradicted by context. The terms "comprising," "having," "including," and "containing" are to be construed as open-ended terms (i.e., meaning "including, but not limited to,") unless otherwise noted. The term "connected" is to be construed as partly or wholly contained within, attached to, or joined together, even if there is something intervening. Recitation of ranges of values herein are merely intended to serve as a shorthand method of referring individually to each separate value falling within the range, unless otherwise indicated herein and each separate value is incorporated into the specification as if it were individually recited herein. All methods described herein can be performed in any suitable order unless otherwise indicated herein or otherwise clearly contradicted by context. The use of any and all examples, or exemplary language (e.g., "such as") provided herein, is intended merely to better illuminate embodiments of the disclosure and does not pose a limitation on the scope of the disclosure unless otherwise claimed. No language in the specification should be construed as indicating any non-claimed element as essential to the practice of the disclosure.

Disjunctive language such as the phrase "at least one of X, Y, or Z," unless specifically stated otherwise, is intended to be understood within the context as used in general to present that an item, term, etc., may be either X, Y, or Z, or any combination thereof (e.g., X, Y, and/or Z). Thus, such disjunctive language is not generally intended to, and should not, imply that certain embodiments require at least one of X, at least one of Y, or at least one of Z to each be present.

Preferred embodiments of this disclosure are described herein, including the best mode known to the inventors for carrying out the disclosure. Variations of those preferred embodiments may become apparent to those of ordinary skill in the art upon reading the foregoing description. The inventors expect skilled artisans to employ such variations as appropriate and the inventors intend for the disclosure to be practiced otherwise than as specifically described herein. Accordingly, this disclosure includes all modifications and equivalents of the subject matter recited in the claims appended hereto as permitted by applicable law. Moreover, any combination of the above-described elements in all possible variations thereof is encompassed by the disclosure unless otherwise indicated herein or otherwise clearly contradicted by context.

All references, including publications, patent applications, and patents, cited herein are hereby incorporated by reference to the same extent as if each reference were individually and specifically indicated to be incorporated by reference and were set forth in its entirety herein.

In the foregoing specification, aspects of the disclosure are described with reference to specific embodiments thereof, but those skilled in the art will recognize that the disclosure is not limited thereto. Various features and aspects of the above-described disclosure may be used individually or jointly. Further, embodiments can be utilized in any number of environments and applications beyond those described herein without departing from the broader spirit and scope of the specification. The specification and drawings are, accordingly, to be regarded as illustrative rather than restrictive.

The specific details of particular embodiments may be combined in any suitable manner or varied from those shown and described herein without departing from the spirit and scope of embodiments of the disclosure.

The above description of exemplary embodiments of the disclosure has been presented for the purposes of illustration and description. It is not intended to be exhaustive or to limit the disclosure to the precise form described, and many modifications and variations are possible in light of the teaching above. The embodiments were chosen and described in order to best explain the principles of the disclosure and its practical applications to thereby enable others skilled in the art to best utilize the disclosure in various examples and with various modifications as are suited to the particular use contemplated.

All publications, patents, and patent applications cited herein are hereby incorporated by reference in their entirety for all purposes.

What is claimed is:

1. A method of providing access to a cloud service, comprising:
   receiving, by a request forwarder hosted on a compute instance of the cloud service, a request for access to the cloud service, the request (a) being received from a container hosted on the compute instance and (b) including a container credential of the container;
   determining, by the request forwarder, an identification of the container using the container credential;
   communicating with a container orchestrator to validate the container credential; and
   based at least in part on a determination that the container credential is valid:
      requesting, by the request forwarder from a metadata service hosted on the compute instance, an instance credential for the compute instance;
      receiving the instance credential for the compute instance from the metadata service hosted on the compute instance; and
      sending the request and the instance credential to the cloud service.

2. The method of claim 1, further comprising:
   caching, in at least one cache, the identification of the container corresponding to the container credential, and the instance credential;
   receiving, by the request forwarder, a second request from the container for access to the cloud service, wherein the second request includes the container credential;
   determining, by the request forwarder, at least by referencing the at least one cache:
      the identification of the container corresponding to the container credential, and
      the instance credential;
   sending, to the cloud service, the second request and the instance credential from the at least one cache.

3. The method of claim 2, wherein the instance credential expires upon an expiry time, and wherein the method further comprises:
   prior to the expiry time:
      requesting, by the request forwarder from the metadata service, an updated instance credential for the compute instance;
      receiving the updated instance credential for the compute instance from the metadata service; and
      caching the updated instance credential in the at least one cache.

4. The method of claim 1, wherein the container orchestrator verifies that the container requesting access to the cloud service is authorized based at least in part on one or more stored policies that define permissions for container access to the cloud service.

5. The method of claim 1, wherein the metadata service stores one or more instance credentials that are used to access the cloud service.

6. The method of claim 1, wherein the container orchestrator maintains a directory that maps container credentials to container identities.

7. The method of claim 1, wherein the container credential is a network-based identity credential.

8. The method of claim 1, wherein determining the identification of the container using the container credential comprises:
   forwarding the container credential to the container orchestrator, wherein responsive to receiving the container credential, the container orchestrator provides to the request forwarder, the identification of the container.

9. The method of claim 1, further comprising:
   verifying, by the request forwarder, based at least in part on the instance credential, that the container requesting access to the cloud service is authorized.

10. One or more non-transitory computer readable media comprising instructions which, when executed by one or more hardware processors, causes performance of operations comprising:
   receiving, by a request forwarder hosted on a compute instance of a cloud service, a request for access to the cloud service, the request (a) being received from a container hosted on the compute instance and (b) including a container credential of the container;
   determining, by the request forwarder, an identification of the container using the container credential;
   communicating with a container orchestrator to validate the container credential; and
   based at least in part on a determination that the container credential is valid:
      requesting, by the request forwarder from a metadata service hosted on the compute instance, an instance credential for the compute instance;

receiving the instance credential for the compute instance from the metadata service hosted on the compute instance; and
sending the request and the instance credential to the cloud service.

11. The media of claim 10, wherein the operations further comprise:
caching, in at least one cache, the identification of the container corresponding to the container credential, and the instance credential;
receiving, by the request forwarder, a second request from the container for access to the cloud service, wherein the second request includes the container credential;
determining, by the request forwarder, at least by referencing the at least one cache:
the identification of the container corresponding to the container credential, and
the instance credential;
sending, to the cloud service, the second request and the instance credential from the at least one cache.

12. The media of claim 11, wherein the instance credential expires upon an expiry time, and wherein the operations further comprise:
prior to the expiry time:
requesting, by the request forwarder from the metadata service, an updated instance credential for the compute instance;
receiving the updated instance credential for the compute instance from the metadata service; and
caching the updated instance credential in the at least one cache.

13. The media of claim 10, wherein the container orchestrator verifies that the container requesting access to the cloud service is authorized based at least in part on one or more stored policies that define permissions for container access to the cloud service.

14. The media of claim 10, wherein the metadata service stores one or more instance credentials that are used to access the cloud service.

15. The media of claim 10, wherein the container orchestrator maintains a directory that maps container credentials to container identities.

16. The media of claim 10, wherein the container credential is a network-based identity credential.

17. The media of claim 10, wherein determining the identification of the container using the container credential comprises:
forwarding the container credential to the container orchestrator, wherein responsive to receiving the container credential, the container orchestrator provides to the request forwarder, the identification of the container.

18. The media of claim 10, wherein the operations further comprise:
verifying, by the request forwarder, based at least in part on the instance credential, that the container requesting access to the cloud service is authorized.

19. A system, comprising:
at least one hardware processor;
the system being configured to execute operations, using the at least one hardware processor, the operations comprising:
receiving, by a request forwarder hosted on a compute instance of a cloud service, a request for access to the cloud service, the request (a) being received from a container hosted on the compute instance and (b) including a container credential of the container;
determining, by the request forwarder, an identification of the container using the container credential;
communicating with a container orchestrator to validate the container credential; and
based at least in part on a determination that the container credential is valid:
requesting, by the request forwarder from a metadata service hosted on the compute instance, an instance credential for the compute instance;
receiving the instance credential for the compute instance from the metadata service hosted on the compute instance; and
sending the request and the instance credential to the cloud service.

20. The system of claim 19, wherein the operations further comprise:
caching, in at least one cache, the identification of the container corresponding to the container credential, and the instance credential;
receiving, by the request forwarder, a second request from the container for access to the cloud service, wherein the second request includes the container credential;
determining, by the request forwarder, at least by referencing the at least one cache:
the identification of the container corresponding to the container credential, and
the instance credential;
sending, to the cloud service, the second request and the instance credential from the at least one cache.

21. The system of claim 20, wherein the instance credential expires upon an expiry time, and wherein the operations further comprise:
prior to the expiry time:
requesting, by the request forwarder from the metadata service, an updated instance credential for the compute instance;
receiving the updated instance credential for the compute instance from the metadata service; and
caching the updated instance credential in the at least one cache.

22. The system of claim 19, wherein the container orchestrator verifies that the container requesting access to the cloud service is authorized based at least in part on one or more stored policies that define permissions for container access to the cloud service.

23. The system of claim 19, wherein the metadata service stores one or more instance credentials that are used to access the cloud service.

24. The system of claim 19, wherein the container orchestrator maintains a directory that maps container credentials to container identities.

25. The system of claim 19, wherein the container credential is a network-based identity credential.

26. The system of claim 19, wherein determining the identification of the container using the container credential comprises:
forwarding the container credential to the container orchestrator, wherein responsive to receiving the container credential, the container orchestrator provides to the request forwarder, the identification of the container.

27. The system of claim 19, further comprising:
verifying, by the request forwarder, based at least in part on the instance credential, that the container requesting access to the cloud service is authorized.

* * * * *